US011482117B2

(12) United States Patent
Sachs et al.

(10) Patent No.: US 11,482,117 B2
(45) Date of Patent: Oct. 25, 2022

(54) RISK ASSESSMENT FOR UNMANNED AERIAL VEHICLES

(71) Applicant: A3 BY AIRBUS LLC, Sunnyvale, CA (US)

(72) Inventors: Peter Sachs, San Francisco, CA (US); Richard Golding, San Francisco, CA (US); Joseph Polastre, San Francisco, CA (US); Karthik Balakrishnan, San Francisco, CA (US); Ryan Rodriguez, Hayward, CA (US)

(73) Assignee: A3 by Airbus, Sunnyvale, CA (US)

( * ) Notice: Subject to any disclaimer, the term of this patent is extended or adjusted under 35 U.S.C. 154(b) by 249 days.

(21) Appl. No.: 16/499,727

(22) PCT Filed: May 24, 2019

(86) PCT No.: PCT/US2019/034057
§ 371 (c)(1),
(2) Date: Sep. 30, 2019

(87) PCT Pub. No.: WO2020/242447
PCT Pub. Date: Dec. 3, 2020

(65) Prior Publication Data
US 2021/0358310 A1    Nov. 18, 2021

(51) Int. Cl.
*G08G 5/00* (2006.01)
*B60L 58/10* (2019.01)
(Continued)

(52) U.S. Cl.
CPC .............. *G08G 5/003* (2013.01); *B60L 58/10* (2019.02); *B64D 45/00* (2013.01); *G01C 21/20* (2013.01);
(Continued)

(58) Field of Classification Search
CPC ........ G08G 5/003; G08G 5/045; B60L 58/10; B60L 2200/10; B64D 45/00; G01C 21/20; G07C 5/008
(Continued)

(56) References Cited

U.S. PATENT DOCUMENTS 7,194,353 B1    3/2007    Baldwin et al.
9,542,849 B1    1/2017    Bertram et al.
(Continued)

FOREIGN PATENT DOCUMENTS

WO    2018091870 A1    5/2018
WO    2018110634 A1    6/2018

OTHER PUBLICATIONS

Nieto et al. , Development of a three-dimensional collision risk model tool top access safety in high density en-route airspace, J Aerospace engineering, Mar. 3, 2010, Proc. IMech E, vol. 224, part G, p. 119-1129.*

(Continued)

*Primary Examiner* — Muhammad Shafi
(74) *Attorney, Agent, or Firm* — Maynard Cooper & Gale, P.C.; Jon E. Holland, Esq.

(57) ABSTRACT

Data associated with a flight, including a flight plan, a vehicle, and/or a pilot is processed via a risk assessment platform to obtain one of more numerical risk values, for example a ground risk value and an air risk value. Based on the processed data, a matrix of risk assessment decisions is generated containing risk related information (such as risk remediation information). Accordingly, based on a consistent set of risk relation information, a predictable and repeatable flight decision (such as a decision whether to fly, or an adjustment to a flight route) can be made. In some instances, the data to be processed is quantitative data collected from one or more third party systems, such as
(Continued)

sensor data or geospatial data. The risk assessment platform includes toolkits or services to be used in the processing and transformation of this data to reach a risk assessment decision.

25 Claims, 22 Drawing Sheets

(51) Int. Cl.
  *B64D 45/00* (2006.01)
  *G01C 21/20* (2006.01)
  *G07C 5/00* (2006.01)
  *G08G 5/04* (2006.01)

(52) U.S. Cl.
  CPC ............ *G07C 5/008* (2013.01); *G08G 5/045* (2013.01); *B60L 2200/10* (2013.01)

(58) Field of Classification Search
  USPC .......................................................... 701/14
  See application file for complete search history.

(56) References Cited

U.S. PATENT DOCUMENTS

| | | | | |
|---|---|---|---|---|
| 10,672,281 | B2* | 6/2020 | Fanelli | ................. G08G 5/0013 |
| 2015/0323931 | A1* | 11/2015 | Downey | ............. G05D 1/0011 |
| | | | | 701/2 |
| 2019/0019423 | A1* | 1/2019 | Choi | ...................... G05D 1/106 |
| 2019/0311636 | A1* | 10/2019 | Fanelli | ................... G08G 5/045 |

OTHER PUBLICATIONS

Nieto et al., Development of a three-dimensional collision risk model tool top access safety in high density en-route airspace", J Aerospace engineering, Mar. 3, 2010", Proc. Mech E, vol. 224, part G, pp. 119-1129.*

Lum et al., Accessing and Estimating Risk of Operating Unmanned Aerial System in populated Areas, 11th AIAA Aviation Technology , AIAA 2011-6918, Sep. 20-22, 2011, p. 1-12.*

Nieto et al. "Development of a three-dimensional collision risk model tool to assess safety in hign density en-route airspaces." In: Proceedings of the Institution of Mechanical Engineers Part G Journal of Aerospace Engineering, Oct. 2010, [online] [retrieved on Jul. 25, 2019 (Jul. 25, 2019)] Retrieved from the Internet <URL:https://www.researchgate.net/publication/245393261_Development_of_a_threedimensional_collision_risk_model_tool_to_assess_safety jn_high_density_enroute_airspaces>.

Lum et al. "Assessing and Estimating Risk of Operating Unmanned Aerial Systems in Populated Areas." In: 11th AIAA Aviation Technology, Integration, and Operations (ATIO) Conference, Sep. 20-22, 2011, [online] [retrieved on Jul. 25, 2019 (Jul. 25, 2019)] Retrieved from the Internet <URL:https://pdrs.semanticscholar.org/1f7a/4409634d68ecd04ced235b8c810e0f5a0a17.pdf>.

PCT/US19/34057 (ISA/210) International Search Report [25].

EPO Communication, the supplementary European search report and the European search opinion. dated Nov. 19, 2021.

* cited by examiner

| | Intrinsic UAS Ground Risk Class | | | |
|---|---|---|---|---|
| Max UAS characteristics dimension | 1m/ approx. 3ft | 3m/ approx. 10ft | 8m/ approx. 25ft | >8m/ approx. 25ft |
| *Typical kinetic energy expected* | *< 700 J (approx. 529 Ft Lb)* | *< 34 KJ (approx. 25000 Ft Lb)* | *< 1084 KJ (approx. 800000 Ft Lb)* | *> 1084 KJ (approx. 800000 Ft Lb)* |
| Operational scenarios | | | | |
| VLOS over controlled area, located inside a sparsely populated environment | 1 | 2 | 3 | 5 |
| BVLOS over sparsely populated environment (over-flown areas uniformly inhabited) | 2 | 3 | 4 | 6 |
| VLOS over controlled area, located inside a populated environment | 3 | 4 | 6 | 8 |
| VLOS over populated environment | 4 | 5 | 7 | 9 |
| BVLOS over controlled area, located inside a populated environment | 5 | 6 | 8 | 10 |
| BVLOS over populated environment | 6 | 7 | 9 | 11 |
| VLOS over gathering of people | 7 | | | |
| BVLOS over gathering of people | 8 | | | |

FIG. 3D

| | Intrinsic UAS Ground Risk Class | | | |
|---|---|---|---|---|
| Max UAS characteristics dimension | 1m/ approx. 3ft | 3m/ approx. 10ft | 8m/ approx. 25ft | >8m/ approx. 25ft |
| Typical kinetic energy expected | < 700 J (approx. 529 Ft Lb) | < 34 KJ (approx. 25000 Ft Lb) | < 1084 KJ (approx. 800000 Ft Lb) | > 1084 KJ (approx. 800000 Ft Lb) |
| Operational scenarios | | | | |
| VLOS over controlled area, located inside a sparsely populated environment | 1 | 2 | 3 | 5 |
| BVLOS over sparsely populated environment (over-flown areas uniformly inhabited) | 2 | 3 | 4 | 6 |
| VLOS over controlled area, located inside a populated environment | 3 | 4 | 6 | 8 |
| VLOS over populated environment | 4 | 5 | 7 | 9 |
| BVLOS over controlled area, located inside a populated environment | 5 | 6 | 8 | 10 |
| BVLOS over populated environment | 6 | 7 | 9 | 11 |
| VLOS over gathering of people | 7 | | | |
| BVLOS over gathering of people | 8 | | | |

FIG. 3D

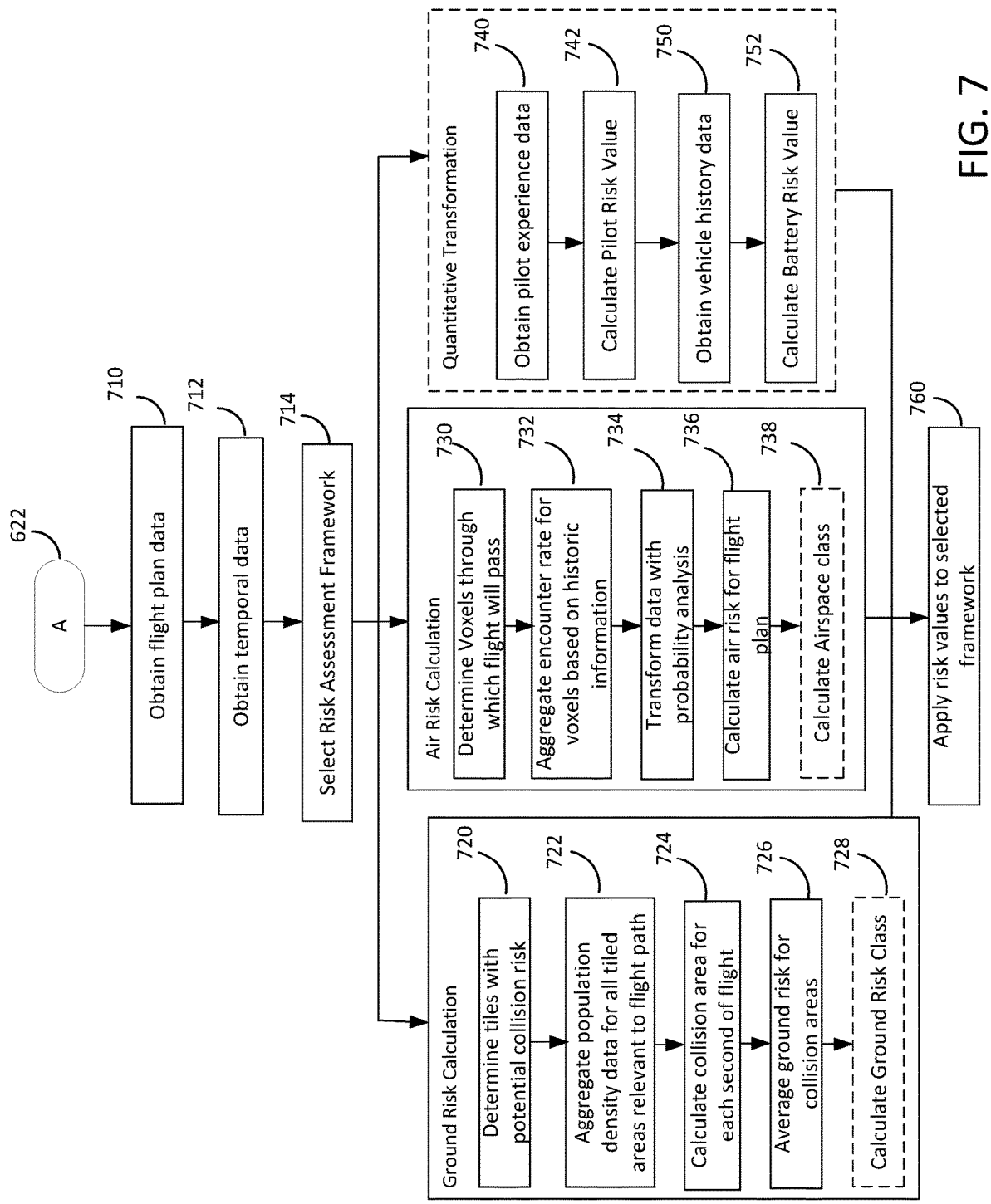

RISK ASSESSMENT FOR UNMANNED AERIAL VEHICLES

BACKGROUND

Safety Risk Management (SRM) systems are necessary to predict and manage risk associated with every flight, whether manned or unmanned. Safety management systems for manned aircraft are well established, however unmanned aircrafts are, in many geographic areas, set to become increasingly present. For instance, drones, for hobby and commercial purposes (such as data collection and delivery), air taxis in the form of light planes, helicopters, electric vertical take-off and landing aircraft (e-VTOL), and the like, government drones and vehicles, and other commercial and private unmanned flight may share airspace with traditional manned aircraft, at high, medium, and low altitudes. There may be limitations in the availability and/or quantifiability of data relating to unmanned aircraft, and therefore the risk associated with flight (and the acceptability of that risk) is difficult to accurately calculate or predict.

Existing frameworks for risk management in manned flight are largely qualitative in nature and may not be suitable for unmanned vehicles. More particularly, a human operator (e.g., a pilot, an air traffic controller, a mechanic, or another party) may follow a checklist or set of steps to determine whether they have adequately managed risk. Such a checklist may ask for subjective analysis of, for instance, geospatial and geographic characteristics, the condition of the aircraft, and/or the experience of the crew, among many other things. The perceived risks are therefore limited by the subjective, qualitative data provided through human intelligence and analysis. In unmanned flight, human intelligence may be limited by the experience of an operator (of e.g., a drone), who may have limitations in training, flight time, and/or certification.

One known framework for unmanned systems is SORA (Specific Operations Risk Assessment) developed by the Joint Authorities for Rulemaking of Unmanned Systems (JARUS). SORA sets out a qualitative process to determine a Specific Assurance and Integrity Level (SAIL), which sets out the types of safety-mitigating actions an operator of an unmanned vehicle must perform before a given unmanned aircraft flight is determined to be safe (and is therefore permitted) by a regulatory agent. However, because SORA is not quantitative in nature, the framework lacks predictability. That is, regulators reviewing a flight plan may be unclear of how inputs to the SORA framework (e.g., safety plans, threat mitigations, population scarcity, and other qualitative determinations) were made, and therefore, approval may require extensive time and/or discussion, stretching to days or weeks.

Solutions for risk management for unmanned vehicles that provide greater predictability and repeatability are therefore generally desired.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure.

FIG. 3D is a diagram illustrating a table that associates a vehicle type and size and a ground risk category with a particular ground risk class value.

DETAILED DESCRIPTION

Figure 1:
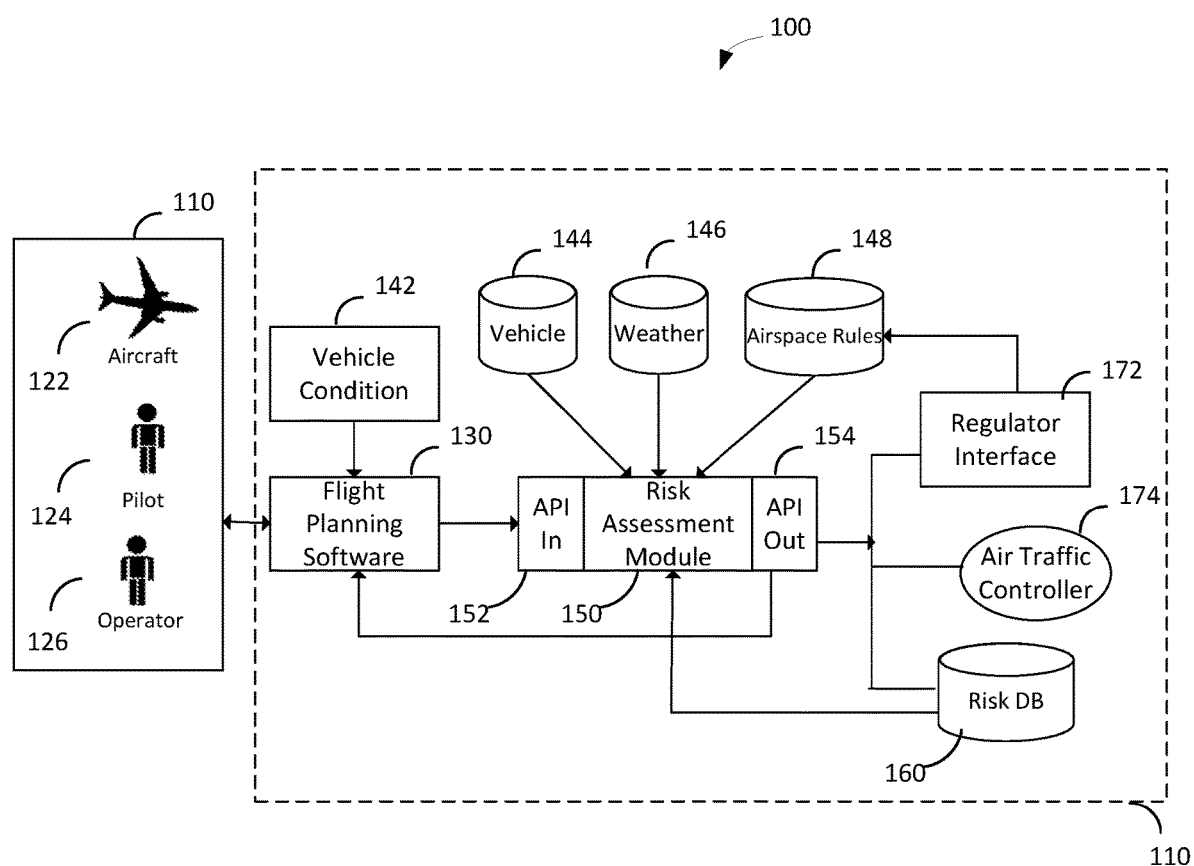
FIG. 1 is a diagram illustrating a block diagram of a risk management system in accordance with some embodiments of the present disclosure.

The present disclosure generally pertains to systems and methods for safety risk management for unmanned aerial systems (UAS) that allows for the quantification of data traditionally entered under a qualitative analysis. In one embodiment, a risk framework takes in inputs typically used in a qualitative (or partially qualitative) risk analysis, along with a flight plan, and maps them to numerical calculations for ground risk and air risk. These calculated ground risk and air risk values may be used to reference a predetermined matrix of risk assessment categorizations. In some embodiments, those categorizations may correspond to risk remediation actions. A flight decision may be made based on the risk assessment categorizations associated with the flight plan. In some embodiments, rather than qualitative inputs, the risk framework requires only a flight plan and an identification of a vehicle type.

In some embodiments, a risk framework may be made accessible to a vehicle operator, a regulatory entity, an airspace operator, and/or other third parties through a computer-implemented (e.g., cloud-based) platform, which platform includes toolkits or services to be used in the processing of mission data to reach a risk assessment decision. In one embodiment, information is input in whole or in part through a user interface, such as human and/or computer interaction with an app or website. In one embodiment, vehicle information is pulled automatically from vehicle hardware without human input. In some embodiments, the risk assessment may include the processing and transformation of wholly or partly qualitative data to quantitative data, or vice versa.

In some embodiments, a risk framework employs a partially or wholly quantitative model that prioritizes numerically quantifiable factors relating to the vehicle and/or the proposed mission. In one embodiment, the framework may consider pilot experience and a vehicle's maintenance history. In some embodiments, the framework may take as inputs information about a pilot, such as a number of hours logged piloting a drone, and/or a percentage of drone hours flown manually as opposed to a preprogrammed/autopilot mode. In some embodiments, the framework may take as inputs information about a vehicle, such as a vehicle maintenance history, a history of hardware faults, and/or the presence of safety equipment. In some embodiments, the risk management system may consider temporal conditions. In some embodiments, one or more inputs is quantified through parameterization of these inputs, through, e.g., a grouping or bucketing, an association with a numerical range, a fit of a value into a curve (e.g., multivariate curve, multiple regression, linear regression, or other appropriate equation) or the like.

In some embodiments, a risk management system may take, as input, detailed flight plans, and/or other inputs relating to vehicle health and history, e.g., fuel or battery state, and may transform or process these inputs to obtain a numerical ground risk score and/or a numerical air risk score corresponding to a respective likelihood of ground collision and/or air collision. In some embodiments, the system may perform this task for one or more legs of a planned flight path. The risk management system may use the ground risk score, air risk score, and/or flight plan to provide information to the operator including one or more than one of the following: a risk score, a risk report, a probability of collision, a set of one or more recommendations for risk mitigation, or a flight path approval.

In some embodiments, ground risk is calculated based on a size and/or type of an aircraft and a detailed flight plan. In some embodiments, the risk management system may determine from the flight plan (or may calculate in place of the flight plan) an area over which the vehicle will be flown, a population type or category of such area (e.g., sparse, populated, gathering of people, crowd, and the like), and/or whether such area is a controlled area. In some embodiments, the terms sparse and populated (or similar) are defined through predetermined definitions and/or regulatory definitions. Third party datasets, including satellite data (e.g., LandScan data) may be used to divide the ground space of the Earth into virtual squares (or otherwise-shaped grid cells) of geospatial data, each having an associated population density. The flight plan may be analyzed to determine which of these squares (or grid cells) will be directly passed over during flight, and/or which squares (e.g., neighboring, adjacent, or proximate squares) may be exposed to risk of collision based on a flight's altitude, trajectory, speed, temporal conditions, and the like. The datasets for each of these squares are aggregated, and a calculated value for ground risk for each leg of a flight is determined.

In some embodiments, air risk is calculated based on the size of a vehicle, a detailed flight plan, and/or a protected volume of 3-dimensional space around the vehicle that may be maintained to ensure safe operation and avoid collision. In some embodiments, the risk management system may determine, from the flight plan (or may calculate in place of the flight plan), one or more airspaces through which the vehicle will be flown. Third party, or self-generated, datasets of surveillance data (e.g., RADAR or Automatic Dependent Surveillance-Broadcast (ADS-B) position reports) are collected to determine flight paths associated with respective voxels (cubes or otherwise-shaped areas) of 3-dimensional space over a set amount of time. Position reports of aircrafts following those flight paths may be aggregated or tallied, separate from individual flight identifiers, to determine an airspace density corresponding to a likelihood of collision. The voxels may be subdivided by altitude (e.g., 100 ft. bands of altitude), and/or by time (e.g., hours of day, days of the week, etc.) to provide further granularity of data. The datasets for each of these voxels is aggregated, and a calculated value for air risk for each leg of a flight may be determined.

In some embodiments, the risk management system calculates a battery risk of the aircraft based on inputs of an initial voltage measurement and a flight plan. In some embodiments, the calculation of battery risk may also consider charge state, battery capacity, and/or other metrics of battery condition and status. In some embodiments, the risk management system may determine, from the flight plan (or may calculate in place of the flight plan) one or more of a total planned distance, a average total velocity, a total flight time, and a difference between highest and lowest altitude. This quantitative dataset may be used to determine a battery risk for flight.

In some embodiments, the risk management system calculates an operator risk or pilot risk, based on a flight plan and one or more of a total number of flight hours (e.g., drone hours) for the pilot or operator, a percentage of managed vs. autonomous flight, the training experience of the pilot/operator, a certification status of the pilot/operator and/or other attributes of the pilot/operator's prior operating experience, a registered proficiency of the pilot/operator, temporal conditions (e.g., weather), vehicle conditions (e.g., maintenance), and/or jurisdictional requirements of the area(s) over which the vehicle is intended to be flown. These factors may be mapped to quantitative datasets that may be used to determine a pilot or operator risk for flight.

In some embodiments, the risk assessment system may be interconnected with an unmanned traffic management (UTM) system. The UTM system may also include flight planning software to provide flight planning service(s) and/or flight approval that integrates a risk modeling function. In some embodiments, a flight planning service, via the UTM platform, takes in a flight plan input from an aircraft/pilot/operator/regulatory agency, and pulls data from third party locations, such data including density maps, building formations, pilot information for the pilot assigned to the vehicle, weather data, temporal data regarding the vehicle (e.g., sensor data), among other things. The flight planning service may include a risk assessment component that determines ground risk, air risk, and other risk factors based on this information. The flight planning service may output a risk report, a risk score, one or more risk recommendations, and/or an approval or denial for flight. In some embodiments, the flight planning system may include software implementing a known risk framework such as, for example, SORA or SORA-GER.

By these means, a standard and repeatable solution to obtain numerical risk measurements can be obtained. Unlike known methods, which are largely qualitative, the sources of data in the systems described herein may be generally defined and known, and therefore standardized in form and integrity. Accordingly, because it is standardized, the process(es) behind calculations of risk can be clearly understood, removing or mitigating the back and forth questioning/evidentiary showing necessary for a regulator to understand the means by which a pilot or operator arrived at his assessment. In addition, unlike traditional qualitative risk frameworks, some embodiments of the systems and methods described herein may take into account temporal risk factors, such as weather conditions, vehicle maintenance, fuel load, actual airspace occupancy levels, and the like, mitigating or reducing the amount of additional preflight risk assessment that some operators may need to conduct.

Further, in contrast to traditional risk assessment frameworks, through the systems and methods described herein, a risk assessment software may be provided that visualizes a risk result to an operator, such that an operator can, in relatively real time, modify a flight plan, or take other mitigating actions to conduct a flight without avoidable delay. That is, the process produces guidance for de-risking the flight.

Still further, the systems and methods of quantitative risk assessment provided herein may be used with a variety of known risk assessment frameworks, such that risk assessment may be tailored to geographic, jurisdictional, and/or other regulatory requirements. That is, in some embodiments, the processes can be tailored toward a specific geographic area and/or air navigation service provider (ASNP). This addresses some of the unique security and regulatory challenges of aviation data, while maintaining the certification and configuration of risk management that removes hurdles for both operators and regulators to get more vehicles airborne quickly and safely.

FIG. 1 is a block diagram illustrating the use of an exemplary safety risk management (SRM) system. The data that passes through the SRM system is processed by several entities. In one embodiment, one or more end users or components of an aircraft 122-126 may interact with a SRM system 100 to obtain aviation, geospatial, and/or other data from one or more sources. In some instances, an end user may be an unmanned aircraft 122, such as a hobbyist or commercial drone, a passenger aircraft (e.g., light planes and helicopters, or e-VTOLs), a government drone or vehicle, or any other aircraft that is wholly or partially autonomous, that is, containing at least some autonomous components. For ease of reference, all such vehicles may be referred to herein as unmanned aircraft or unmanned vehicles (or, in some cases, as vehicles), even if a human pilot is on board the vehicle, so long as the vehicle is not subject (or is not entirely subject) to manned aircraft flight rules managed by traditional air traffic management services. In an exemplary embodiment, an unmanned vehicle has, integral to the aircraft, at least some autonomous components, however other configurations are possible in different embodiments. Some unmanned vehicles may have a pilot 124 (including humans and/or automated pilot functionalities) that controls the aircraft, sometimes remotely, and relies upon traffic management services to receive guidance on where and when to fly. These vehicles and/or pilots may seek flight planning services that authorize flight and/or provide guidance to mitigate risk and maintain separation between aircraft, to allow safe transit of the aircraft. In some embodiments, unmanned vehicles may include piloted aircraft for which the pilot subscribes to advisory and/or information services, for example for increased safety or other goals. In other embodiments, unmanned vehicles may include piloted aircraft in which autonomous functionalities are not incorporated integrally into the aircraft, but are instead provided by a separate mobile (or other) device. As one example, an implementation where a pilot uses, for instance, a mobile phone such an iPhone or Android device, an iPad or tablet device, a laptop, touchscreen device, or the like in the piloting of the aircraft may be considered in some embodiments to be an unmanned vehicle. Some unmanned vehicles may have an operator 126 that plans and oversees a vehicle's mission, which planning may include, for instance, the setting and filing of the vehicle's flight plan. The operator 126 may rely upon flight planning services to find the flight path they would like to use for their mission, submit a requested flight plan for regulatory compliance, assess risk, and the like. Of course, these are just three of many possible user types, and other users may include, for instance, government or other regulatory agencies. Further, while only three users 122-126 are shown in FIG. 1, it will be generally understood that the number and type of users is not limited, and other embodiments may include any number of users of any type. It will also be understood that all of autonomous aircraft system 122, pilot 124 and operator 126 may have access to similar flight planning and/or risk management tools. As a result, solely for ease of reference, all of autonomous aircraft system 122, pilot 124 and operator 126 may be referred to herein as an operator 110.

An operator 110, as part of flight planning prior to take-off of a vehicle, may go through one or more risk evaluation(s) on a flight-by-flight basis. The operator 110 may in some embodiments access flight planning software 130 to assist in the performance of the flight planning process. Flight planning software 130 may reference a particular risk model, here risk assessment module 150, which inputs/outputs data through one or more APIs 152, 154. The risk assessment module 150, together with the flight planning software 130, may provide to the operator one or more of: a risk score, a probability of collision, a set of one or more recommendations for risk mitigation, or a flight path approval. While the embodiment of FIG. 1 shows risk assessment module 150 as a component separate from flight planning software 130, it may be possible in some embodiments for the risk assessment module to be encompassed by the flight planning software, or dynamically linked therefrom, or that different embodiments may variously implement the physical and/or logical separation or inclusion of these components (or of any components in the illustrated system 100).

In some embodiments, the flight planning software 130 or another component related to a UTM functionality, may implement or execute a path planning algorithm that may take into account various factors in a risk assessment, as well as other data sources, to propose a safe route that avoids (or reduces risk to) ground-based and air-based risk areas. This proposal may take the form, for example, of a notification or suggestion presented to an operator and/or regulatory agency, a comprehensive updated flight plan, or a pre-flight recommendation, among other things. The path planning software may also identify and/or propose conditions and/or regions that may result in an unsafe flight (e.g. weather conditions that exceed the vehicle's performance limits). These path planning changes may be made either with or without human involvement, or any combination of manual and autonomous input and output. The functions of flight planning software 130 may be executed, in some embodiments, by one or more processors (not shown), which may include one or more of any of a central processing unit (CPU), a digital signal processor (DSP), a graphics processing unit (GPU), an FPGA, an ASIC, or other types of processing hardware, or any combination thereof to implement the logic of the flight planning software 130. That logic may, in different embodiments, be implemented in hardware, software, firmware, or any combination thereof.

Risk assessment module 150 may require various kinds of data to inform its risk analyses and decisions, such as weather, vehicle data, geospatial data about air density and ground density, regional policy settings data, and/or terrain data, among other things. The risk assessment model may therefore be facilitated through analysis of data provided by one or more third party systems 144-148. In one embodiment, each system 144-148 outputs a respective set of raw data corresponding, e.g., to information about the vehicle and/or the current condition of the vehicle (144), weather or surveillance conditions (146), airspace rules (148) corresponding to the airspace around the aircraft or within which the aircraft's flight plan falls, or other types of temporal data (not specifically shown). In one embodiment, this data may be, in whole or in part, real-time data that is relatively static in scope, facilitating, e.g., a "data dump" or a set of unanalyzed data. The data may also in some embodiments be, in whole in part, analyzed data (e.g., processed, filtered, or transformed data), such as sensor data or satellite data, or input data dependent on human input. The various datasets output from the systems 144-148 may be stored in one of more data storages, e.g., either risk database 160 or in other local or remote storage (not shown) accessible to the risk assessment module 150.

In one embodiment, a third party managing one or more of systems 144-148 is duly licensed in accordance with all regulatory requirements to provide the data contained therein, if applicable, though in other embodiments, varying levels of licensing may apply. In some embodiments, the data may be subscription data collected (pulled) or pushed from the third party source. In some embodiments, hardware sources of the data from the systems 144-148 may themselves be certified or validated to ensure accuracy, integrity, data format, and the like.

The risk assessment module 150 processes data from its sources (144-148, 160) along with, in some embodiments, one or more sets of data input through the flight planning software 130 via API 152. This processing is described in greater detail below. The processing of the data by the risk assessment module 150 may include, in some embodiments, a quantification of data (e.g., grouping/bucketing, fit into a range, fit into a curve, e.g., multivariate curve, multiple regression, linear regression, or any other appropriate equation). In some embodiments it may take in quantitative inputs such as pilot experience, vehicle maintenance history, vehicle performance/fault history, drone hours, percentage flown manually vs. preprogrammed/autopilot, hardware faults, etc. In particular, the risk assessment model reviews, processes, modifies, transforms, and/or aggregates the content of large datasets to identify underlying risk factors. This information may be used in a modelling analysis to calculate ground risk and air risk, and the risk assessment module may ultimately provide a risk score and/or a risk recommendation or remediation, in a manner described in greater detail below.

The output of such analysis by the risk assessment module 150 may be accessible to a variety of entities. Initially operator 110 (aircraft system 122, pilot 124, and/or operator 126) may access the output of the risk assessment module through flight planning software 130 or through another mechanism (such as, e.g., an automatic adjustment to a flight plan, route, or to the aircraft itself, a notification outside of the flight planning software, such as a notification on the system of the aircraft or a messaging feature, or another type of interface corresponding to a UTM service). In some embodiments, a computer-implemented interface (such as a cloud-based website or interface) may be used to access the output of a risk assessment. In addition, regulators 172 of an airspace and/or air traffic controllers 174 may access the output and algorithm for the risk assessment, to determine the results, inputs, data sources, and/or other information. Further, the output of risk assessment module 150 may be stored in one of more databases, such as risk database 160. In some embodiments, risk database 160 may be a secured database, restricting access by computer system, by geographic area, by data type, or by any appropriate measure.

Figure 2:
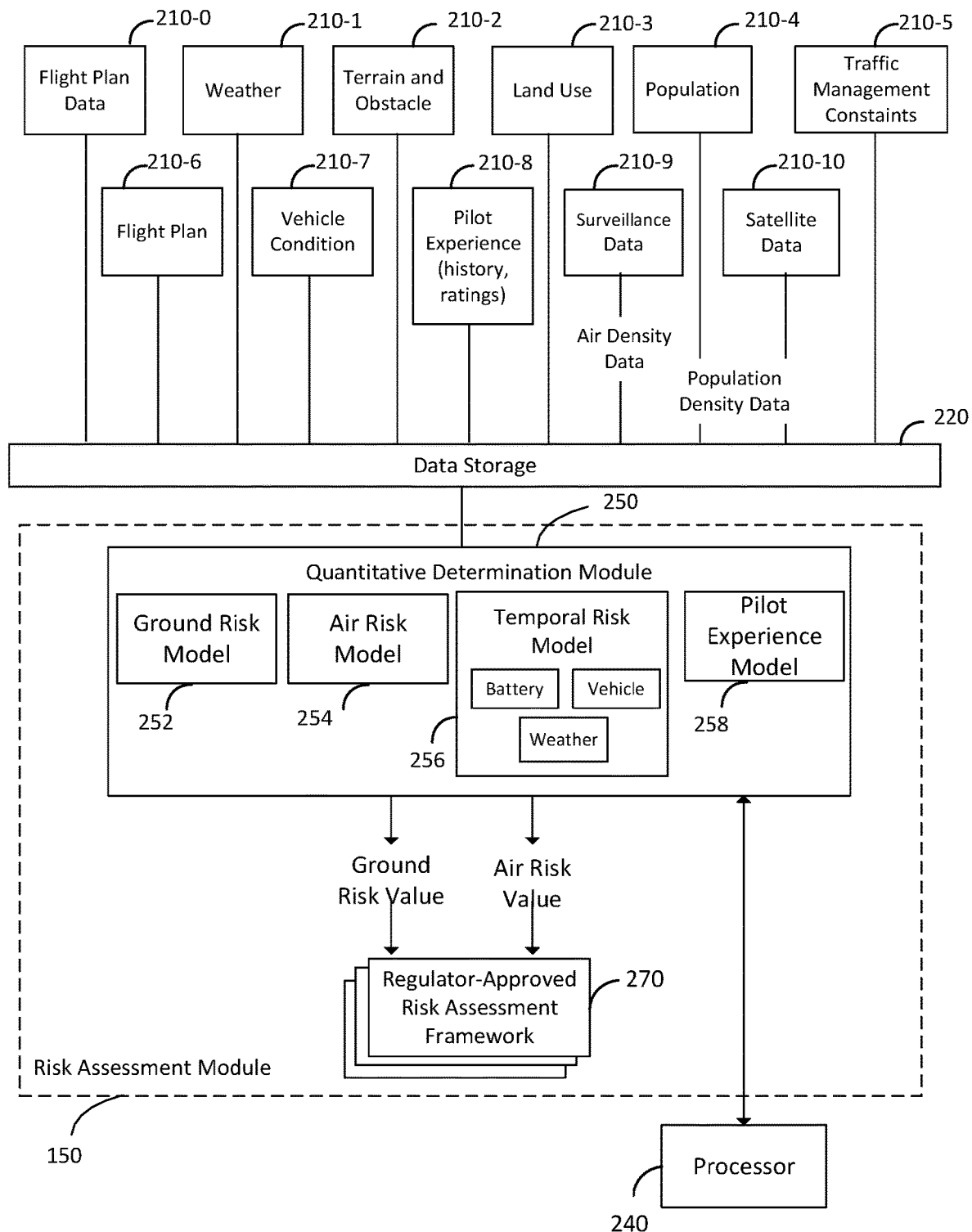
FIG. 2 is a block diagram illustrating an architecture of a risk management system in accordance with some embodiments of the present disclosure.

FIG. 2 illustrates the general principles of one embodiment of the functioning of the risk assessment module 150. The risk assessment module 150 may take in and/or process datasets from a variety of sources that feed into a data storage 220. Data storage 220 may be any suitable storage medium, either volatile and non-volatile (e.g., RAM, ROM, EPROM, EEPROM, SRAM, flash memory, disks or optical storage, magnetic storage, or any other tangible or non-transitory medium), or any number of storage mediums, that stores information that is accessible by processor 240, whether the data storages are located locally or remotely. In some instances, data storage 220 may be safety-of-life certified or otherwise secured, though other configurations are possible in other embodiments. The data sources supplying the relevant datasets may include, in one embodiment, one or more of flight plan data 210-0 (supplied, e.g., by an operator via the flight planning service 130 or via another input point), weather data 210-1, terrain and obstacle data 210-2, land use data 210-3, population data 210-4, flight plan data 210-6, vehicle condition data 219-7, pilot experience data 210-8, surveillance data 210-9, and satellite data 210-10 (collectively, data sources 210), though other data sources may be used in different embodiments.

Risk assessment module 150 includes a variety of models used to reach numerical risk values from the input data (which may in some instances be subjective or quantitative data). In the embodiment illustrated in FIG. 2, such models include at least a ground risk model 252, an air risk model 254, a temporal risk model 256 (considering risk resulting from real-time (or sufficiently current) conditions such as weather, battery, or vehicle conditions), and a pilot experience model 258, though other types of risk may be calculated in different embodiments, based for example on the particular conditions of the flight being assessed. The processing respectively performed by each of these models is described in greater detail below. The information generated by the models may include at least a ground risk value and an air risk value. In some embodiments, it may also include a temporal risk value and/or a pilot experience risk value. The generated risk values may be input into a software implementing a regulator-approved risk assessment framework 270.

Risk assessment module 150 may include one or more instances of software 270 implementing a risk assessment framework, each instance respectively aligning to a different defined risk assessment framework. In the embodiment of FIG. 2, a framework may be variously approved by one or more regulatory agencies, such that one or more frameworks may be appropriate or best suited to, e.g., a particular geographic or jurisdictional area. As one example, an embodiment may exist where the geographic area of flight is within Europe, a regulator-approved risk assessment framework 270 is a SORA framework, and the output of software 270 might be a SORA-specific SAIL calculation, though other frameworks may be used. In other embodiments, one or more frameworks need not require specific regulatory approval, may be more or less stringent than regulatory requirements, or may correspond to other commercial or non-commercial requests or standards. In still other embodiments, flight planning software 130 may select a software 270 corresponding to a particular risk assessment framework based on a determination of the geographic area(s) relevant to the flight plan and/or the operator, such as the areas the vehicle will fly over or areas relevant to operator/aircraft certification. In another embodiment, flight planning software 130 may, in accordance with an input from the operator via a user interface, select one or more of frameworks implemented as software 270. In still other embodiments, risk assessment module 150 may apply a plurality of risk assessment frameworks implemented by software 270, to provide a comparative or comprehensive risk assessment result to the operator (e.g., via a matrix or table shown in a report or via a user interface or display screen).

In the exemplary embodiment of FIG. 2, the risk assessment software 270 corresponding to a particular framework is automatically selected by risk assessment module 150 based on the geographic area(s) indicated by the flight plan input via flight planning software 130. As a result, for all flights within a particular geographic area, the same underlying risk assessment framework is used for consistency of risk calculations. In an exemplary embodiment, any unique framework will require the input of certain consistent types of data each time a risk assessment is performed. Accordingly, in such embodiments, the risk assessment module 150 using a particular framework software 270 may, in each risk assessment iteration, consult the same (or functionally identical) data sources. In some embodiments, functionally identical data sources may be interchangeable, where the data is similar enough in format/scope/integrity (and the source trusted enough) such that the applicable risk assessment frameworks treat the data as equivalent. In some embodiments, some data sources may be preferred based on, e.g., precision, speed of delivery (for real-time or temporal data), length of historical data, granularity of data, sensitivity to temporal conditions such as, e.g., time of day, day of week, population as a function of weather, or other connections that may be drawn between different raw datasets.

The functions of risk assessment module 150 and the calculation models implemented therein are executed, in some embodiments, by one or more processors 240. The processors 240 may include any of a central processing unit (CPU), a digital signal processor (DSP), a graphics processing unit (GPU), an FPGA, an ASIC, or other types of processing hardware, or any combination thereof. Further, the processor 240 may include any number of processing units to provide faster processing speeds and/or redundancy, such processors being local or geographically distributed, or any combination thereof. Processor 240 may also have access to one or more memories that store instructions or logic for implementing the functions of the risk assessment module 150, which logic may be implemented in hardware, software, firmware, or any combination thereof.

With reference to FIGS. 1 and 2, the risk assessment module 150 may be used as part of a pre-flight flight planning service. That is, in some embodiments, prior to (days, hours, or minutes before) departure, the operator may submit detailed flight plans, which may include, e.g., preferential paths, routes, corridors, and timings that the operator expects that flight to use. The flight plan may also contain other inputs related to risk calculation, such as vehicle type and size, vehicle health and fuel state, maintenance conditions, vehicle load, pilot experience, or similar, though in other embodiments, the risk assessment module may pull such data from another source, such as the aircraft's sensors or a data repository. The risk assessment module may also pull temporal data including, e.g., one or more of the aforementioned types of data, weather data, geospatial data, real-time flight data, and/or any data connecting or associating such data, along with population density (ground data) and airspace density (current and/or historical flight paths) and may use such data to identify risk factors. Among such risk factors, the module 150 may consider ground risk and air risk.

Ground risk model 252 calculates a ground risk value representing a predicted probability or likelihood that the aircraft, travelling at a certain height and speed and in a certain geographic area with a certain degree of exposure, will fall, potentially causing damage to the vehicle, or the people and property in the area below. In some embodiments, the ground risk value is a percentage of collision rather than a determination of a worst-case scenario, under the assumption that any collision, regardless of severity, is to be avoided. However, other embodiments may delineate or prioritize ground risk based on severity or risk or fatality or catastrophic injury. The risk of collision calculated by ground risk model 252 may in some embodiments be understood as an encounter rate or encounter density, where the vehicle may encounter any type of obstruction, including, e.g., the ground itself, a building, one or more people, or a non-airborne object. This encounter rate may be used later in relation to a software implementing a risk assessment framework 270.

The ground risk model 252 may, in one embodiment, calculate the predicted density of the area under the flight plan using one or more of the following inputs: the flight's location, time, and duration, population density and exposure of the area flown over, vehicle make, model, and performance characteristics, operator or pilot experience, wind and weather conditions, vehicle maintenance, battery performance, and the like. It may be generally understood that the factors considered by the ground risk model are those determined to have the greatest influence on the risk of loss of control of a UAV, resulting in a crash, collision, flyaway or uncontrolled path or the like, and that in other embodiments, different input values—determined to have such an influence—may be additionally or alternately used. Additional input categories may include, e.g., RF spectrum and communications link characteristics, GNSS coverage, and/or obstacles/terrain that result in degraded navigation accuracy, among other things.

In one exemplary embodiment, ground risk model 252 computes ground risk using a size of a vehicle (whether input by the operator, accessed a database, or confirmed via pulled vehicle sensor data), the area being flown over, and the categorization or type of populated environment, that is, whether the area is sparse, populated, or a gathering of people, a crowd, etc. and/or whether the area flown over is a controlled area (where actions have been taken to remove people or objects). In some embodiments, the terms sparse, populated, gathering, etc. are defined through predetermined definitions and/or regulatory definitions. That is, rather than asking the operator for a subjective assessment of, e.g., population density, land zoning, density categorization, or any other factor, ground risk model 252 uses actual data sets to determine or derive such information.

More particularly, in an exemplary embodiment, third party datasets, including satellite data (e.g., LandScan data (FIG. 2, satellite data 210-10)), which may provide a baseline ambient population distribution over a 24-hour period or another time period, may be used to divide the ground space of the Earth into virtual squares (or otherwise-shaped areas or cells) of geospatial data, each having an associated population density. The flight plan may be analyzed to determine which of these squares will be passed over during flight, and/or may otherwise be in danger of collision based on a vehicle's altitude, speed, temporal conditions, and the like. The datasets for each of these squares is aggregated, and a calculation for ground risk for each leg of a flight is determined.

In some embodiments, the satellite data may be processed in advance of any flight plan data being entered and stored in risk database 260 (or any other appropriate data repository), such that expected population density for any given virtual space (or geo-fence) may be quickly referenced in a table or other appropriate data structure. In some embodiments, the respective virtual ground spaces are delineated in geoJSON format, by longitude and latitude, or other appropriate delineations or identifications may be used in different embodiments. In one embodiment, the virtual ground spaces are squares, that is, the ground space of Earth is gridded into square-shaped cells, however, in other embodiments, other appropriate cell shapes may be used, such as hexagons, triangles, etc. In some embodiments, the shapes may be any appropriate tessellating shapes, so that all areas under a flight plan are covered by one or more virtual spaces. In other embodiments, the tiles may overlap or leave uncovered surface areas of the Earth.

In addition to population density, other information may be collected for each tile, such as zoning requirements, government regulation or standards, etc., which data are available through public data sources, subscription sources, regulatory sources, or the like. In some embodiments, outlines of buildings (skylines), temporary or permanent fixtures (e.g., construction), traffic data, event data (impacting population density), or other types of datasets may be obtained. In some embodiments, real-time population data may be obtained based on cell phone tracking, check-ins, social media (e.g., Facebook) check-ins, or the like to provide temporal population awareness. The ground risk model 252 may merge, aggregate, or otherwise consider in correspondence with each other the collected datasets to find the geospatial layout of the tiles of the virtual grid. Such geospatial data (or any subset thereof) may then be used in a numerical calculation of ground risk.

Satellite data corresponding to population density may be provided from a third party source for a particular granularity of tiling, e.g., 0.01 degrees of latitude and longitude, or approximately 1 square kilometer at the equator. In some embodiments, the tiles or geospatial areas may be similar or identical in size (e.g., 1 km×1 km) and in other embodiments, they may differ in size from each other. The ground risk model 252 may in some embodiments aggregate and re-divide this data to create smaller or larger virtual squares. In some embodiments, this re-division may be done in correspondence to the size of the vehicle and/or the distance to be travelled. In one embodiment, tens or hundreds of virtual squares or tiles may be present within a city block, such granularity being particularly useful for small drones or short, urban distances. In another embodiment, larger distances, such as 100 city blocks, or a number of km or miles, may correspond to a single tile.

Figure 3A:
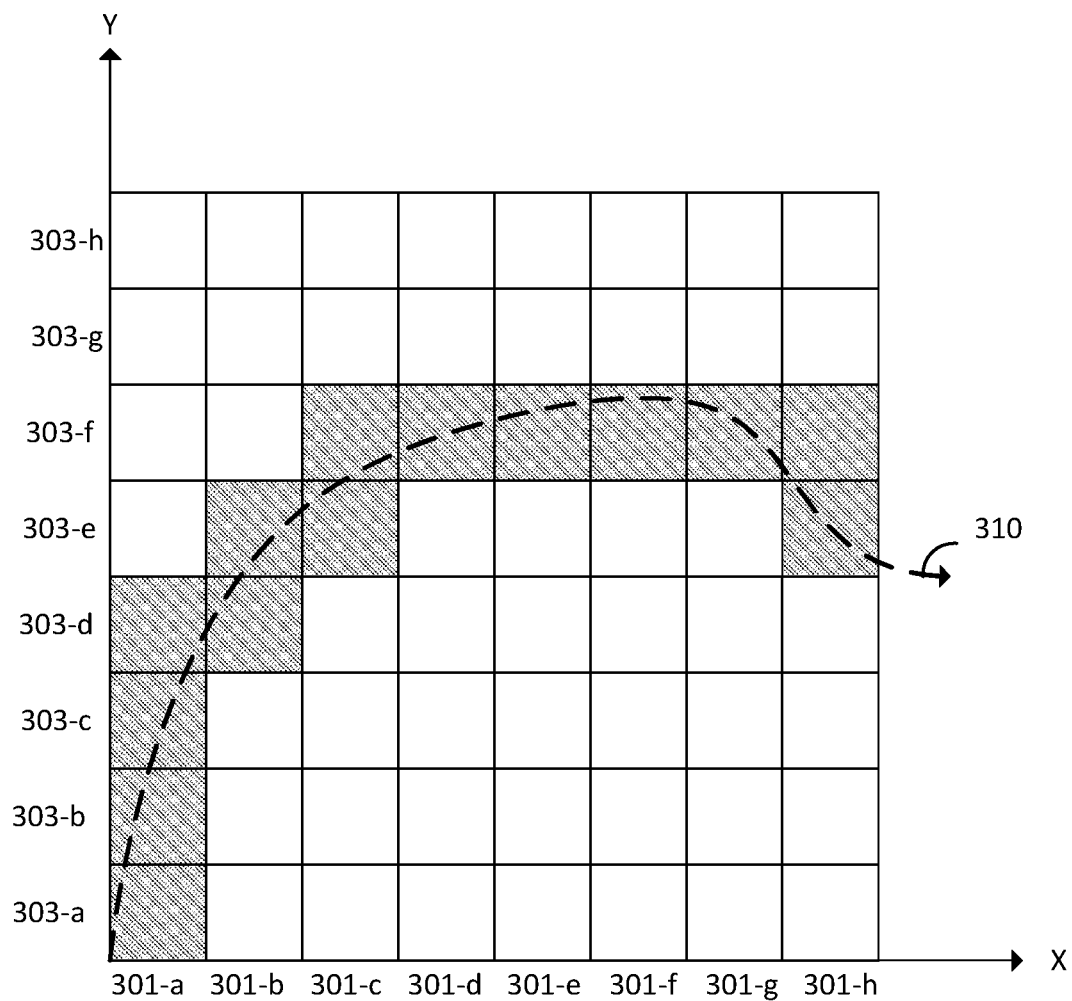
FIG. 3A is a diagram illustrating a calculation perform by a ground risk algorithm in accordance with some embodiments of the present disclosure.

FIG. 3A illustrates a 2-dimensional (top down) layout of a flight path 310 superimposed on a grid of square tiles each representing a distinct geographic area, the tiles being positioned horizontally at positions labelled 301-a through h, and vertically at positions labelled 303-a through h. For instance, the bottom-most, left-most tile may be understood as (301-a, 303-a), while the top-most, right-most title may be understood as (301-h, 303-h). The flight plan 310 (typically provided by the operator via flight planning service 130 or another user interface, but in some embodiments, automatically generated based on, e.g., a takeoff and destination input) may be analyzed to determine which of these tiles (corresponding to respective geographic regions) will be passed over during flight and/or may otherwise be in danger of collision based on a vehicle's altitude, speed, temporal conditions, and the like. In the embodiment of FIG. 3A, the tiles below the flight path 310 are shown colored in gray, each tile indicating that the area under the flight path is an area in which the vehicle may experience a risk of collision, for example if the vehicle falls. The datasets for each of these squares is aggregated, and a calculation for ground risk for each leg of a flight is determined.

Figure 3B:
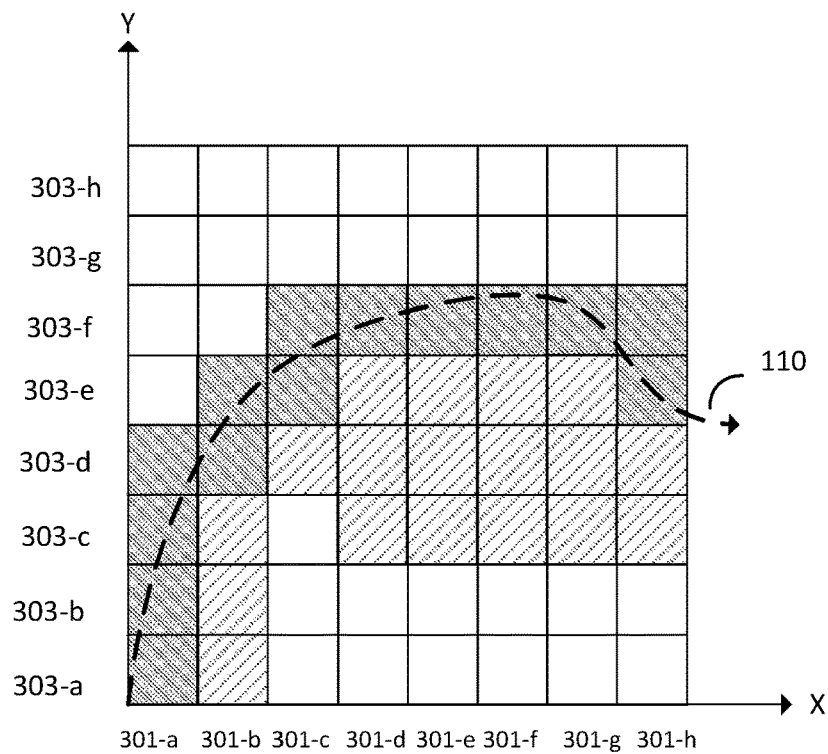
FIG. 3B is a diagram illustrating a calculation perform by a ground risk algorithm in accordance with some embodiments of the present disclosure.

In some embodiments, factors impacting the potential direction and distance of fall of an aircraft may also be considered. For instance, the vehicle's weight, cargo, speed, altitude, wind speed and direction, weather conditions (e.g., rain), and other conditions could be taken into consideration as to what tiles to consider. For instance, wind and vehicle altitude may result in conditions where the vehicle could, upon failure, fall in a direction further south (or any other direction) than the tiles immediately below the anticipated flight path. Accordingly, FIG. 3B illustrates an alternate embodiment in which temporal weather and/or condition data is taken into consideration in a ground risk assessment. For example, given a risk of the aircraft falling into more southern tiles, a ground risk assessment may consider density of population and other risk factors not only the geospatial areas directly below the flight path, but also in areas in a southern direction (within a certain distance) of the flight path. In the illustration of FIG. 3B, assuming that a "southern" direction corresponds to tiles vertically closer to the X-axis, ground risk model 252 may consider, in addition to the tiles below the flight path 310 (such tiles shown in gray, such as (301-a, 303-a)), tiles close to and south of the flight path 310, such tiles shown with angled hatching, such as (301-b, 303-a).

Figure 3C:
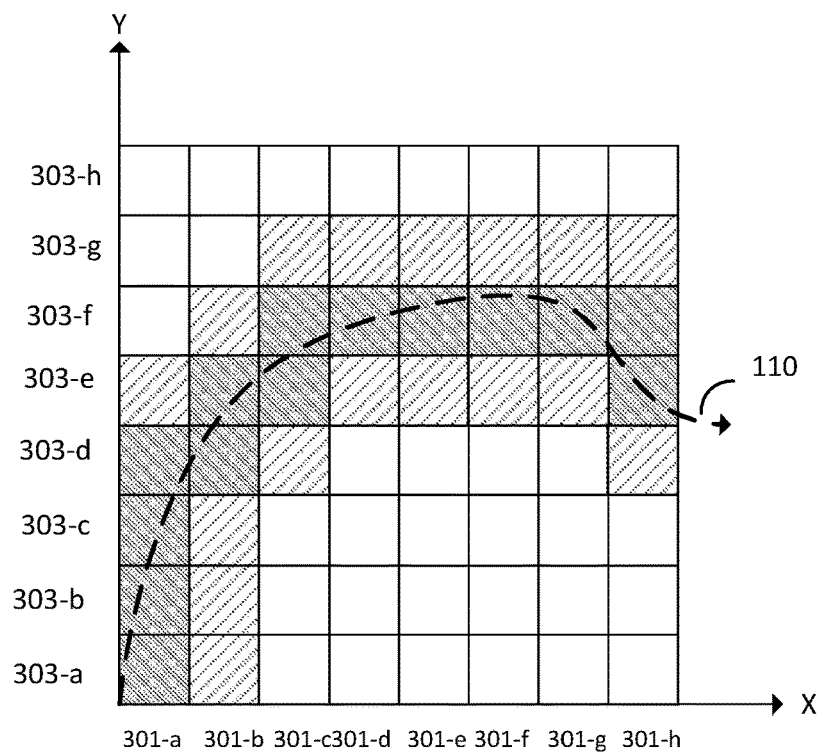
FIG. 3C is a diagram illustrating a calculation perform by a ground risk algorithm in accordance with some embodiments of the present disclosure.

What is more, attitude of the operator and/or regulation or conservatism of assessment (being more or less inclined to a conservative risk assessment) may also lead to a different area being taken into consideration during a ground risk assessment. For example, with reference to FIG. 3C, a more conservative ground risk estimate may consider density of population and other risk factors not only in the geospatial areas below the flight path, but also in adjacent, proximate, neighboring, or otherwise relevant areas. That is, the ground risk estimate may consider grid cells immediately below, adjacent and/or proximate to the flight path, or any grid cell, even far removed from the path, that may experience a risk of collision due to the planned speed, altitude, trajectory, and/or path of the vehicle. In the illustration of FIG. 3C, ground risk model 252 may consider, in addition to the tiles directly below the flight path 310 (such tiles shown in gray, such as (301-a, 303-a), tiles relatively adjacent to and within a certain distance of the tiles below the flight path 310, such tiles shown with angled hatching, such as (301-a, 303-e). For purposes of example, in one embodiment, the tiles immediately below the flight path 310 (shown in gray) may be considered a ground area A, and an extended risk area A' (including the tiles shown with angled hatching) may be calculated by use of the following exemplary formula:

$$A' = \pi(1.3 * h)^2 \qquad \text{[Equation G-1]}$$

where h is the altitude in meters for the flight. Alternate formulas to calculate A' may be used, for example when the attitude of the operator indicates that a more or less conservative calculation of risk (a larger or smaller potential impacted area) is needed. Other embodiments may additionally or alternately consider the speed, the velocity, the weight, the weight or carry load, the wingspan, and/or the trajectory of the aircraft, as well as the physical conditions of the aircraft (such as damage or maintenance) that may impact the direction and distance at which the aircraft may fall.

Ground risk model 252 may use the selected geospatial tiles and the detailed flight plan to predict ground risk for each leg of the flight. For instance, from the flight plan, ground risk model 252 may determine the amount of time the vehicle will spend in the air on each flight segment of the trip. In one embodiment, at each one-second interval (or another increment of time/time step) during a segment of the trip, the ground risk model 252 may perform an altitude-dependent calculation to determine a vehicle's affected (and/or potentially affected) ground area. The stored population density for the respective ground areas is considered as the population of people that might be affected by the vehicle's failure. More particularly, in some embodiments, ground risk model 252 evaluates the adjacent and/or intersecting pixels on the relevant geospatial tiles, to create an aggregated area corresponding to a segment of the flight. A ground risk map for the flight segment may be generated and thereafter stored (e.g., in risk database 160), storing and summing the results for each point along or relevant to the flight path. In some embodiments, a calculated aggregate value of these points may be taken as the ground risk value. In some embodiments, for each point of vehicle location at each one-second interval of the flight (or other interval of time), a given potential impact area (e.g., a circle of impact) can be determined. The ground risk for each pixel within that potential impact area, repeated for each impact area for each 1-second interval, may be calculated in aggregate, such that the risk for the entire route of the flight is determined.

In some embodiments, rather than an encounter rate, the ground risk model 252 may calculate a percentage of casualty, injury, for fatality, or other worst-case or alternate-risk scenario, based on the needs of the operator. For example, in some embodiments, the ground risk model 252 may calculate a risk of fatality C in a predicted impact area, through use of the following exemplary formula:

$$C = \rho_{people} \cdot A \cdot S \cdot P_{tr} \cdot P_f \cdot P_c \qquad \text{[Equation G-2]}$$

where $\rho_{people}$ is the population density in units of people/m², A is the actual impact area in m², S is a dimensionless shelter factor, $P_{tr}$ is the total vehicle risk as the probability of a vehicle failure per flight-hour, $P_c$ is the probability of a collision in the event of a vehicle failure, and $P_f$ is the probability of a fatality in the event of a collision. In some embodiments, $\rho_{people}$ may be calculated using a worst-case area A' representing the entire region where an impact from the debris field could occur (e.g., the cells directly below the flight path as well as those neighboring or proximate), rather than just the actual area A. Additional and/or alternative calculations performed by ground risk model 252 are described in "A Quantitative Framework for UAV Risk Assessment," Peter Sachs, Version 1.0, Sep. 13, 2018, the entirety of which is incorporated by reference herein.

In some embodiments, the "calculated aggregate" of data by the ground risk model 252 is a simple average of population density of the relevant grid cells (geographic areas). In other embodiments, such calculation may be a weighted average. In some embodiments, the risk model 252 may apply a machine learning algorithm, where the particular weights applied in the weighted average are determined based on learned flight and geospatial conditions. In one example, historical wind, altitude, and speed data may serve as training data from which increasingly accurate potential impact areas, and therefore risk maps, can be determined, and associated weighting may applied in a calculated aggregation of the population density at the data points.

In some embodiments, a particular risk assessment framework may require the calculated ground risk value (which may be, in some embodiments, an encounter likelihood or percentage, or an affected population value) associated with each segment of a flight path to be correlated to a ground risk class (GRC). For purposes of example, where an implementation of the SORA framework is used in the software 270, and where the calculated ground risk value is an affected number of people along the flight path route, the ground risk value may be matched to one or more categories ("sparse," "populated," and "gathering of people") in the following manner: <10 people: "sparsely populated environment", 10≤people<500 "populated environment", people≥500: "gathering of people". In another example, where an implementation the SORA-GER framework is used in the software 270, the calculated ground risk may be matched to categories such as "crowd" or "congregation of people." Still other frameworks may use different qualitative descriptors which may be matched to respective numeric outputs (or ranges of numeric outputs) of the ground risk value calculation. In one embodiment, this association of numerical (or otherwise calculated) values to ground risk categories may be done by ground risk model 252 with reference to a predetermined table stored in risk database 160. For purposes of example, with reference to FIG. 3D and the SORA framework, such a table is shown associating a vehicle type and size and a ground risk category with a particular ground risk class value (1-9). Of course, other breakdowns of ground risk categories, no correlation to categories, and/or a direct output or use of the calculated ground risk value may be used in different embodiments.

Air risk model 254 calculates an air risk value representing a predicted probability or likelihood that the aircraft, travelling at a certain height and speed and in a certain 3-dimensional geographic area will impact or collide with another aircraft. In some embodiments, this air risk value may be a numerical value (encounter rate) or a percentage value of air density. This encounter rate may be used later in relation to software 270 implementing a risk assessment framework. In an exemplary embodiment, for purposes of determining an encounter rate, an encounter may simply mean that the vehicle and another aircraft are within the same voxel (three-dimensional delineated airspace) at the same time, such that a collision is possible (even if the flight paths do not otherwise cross or collision does not otherwise occur). Other definitions of encounter may be possible in other embodiments.

The air risk model 254 may, in some embodiments, calculate air risk, the predicted "air density" or encounter rate, of the 3-dimensional area through which the flight plan indicates the vehicle will fly using one or more of the following inputs: the flight's location, time, duration, air traffic density, vehicle make, model, and performance characteristics, operator or pilot experience, wind and weather conditions, vehicle maintenance, historic vehicle performance (e.g., performance faults in a given period of time or number of flights), battery performance, and the like. In some embodiments, air risk model 254 may also consider or implement a protected volume of 3-dimensional space around the vehicle that may be maintained to ensure safe operation and avoid collision. The protected volume may be predetermined in advance (e.g., by the operator or set by regulatory guidelines), or, in other embodiments, may be determined by the air risk model 254 based on the type of aircraft, wingspan, altitude, speed, geographic area, and/or any other relevant factors. It may be generally understood that the factors considered by the air risk model are those determined to have the greatest influence on the risk of collision, and that in other embodiments, different input values determined to have such an influence may be used. Additional input categories may include, e.g., RF spectrum and communications link characteristics, GNSS coverage, and/or obstacles/terrain that result in degraded navigation accuracy, e.g., limited line of sight or inter-vehicle communication, and the like.

In one exemplary embodiment, the air risk model 254 computes air risk using a size and/or type of a vehicle (whether input by the operator, accessed a database, or confirmed via pulled vehicle sensor data), one or more airspaces through which the vehicle will be flown, and historical data about flight paths of other vehicles. In this regard, third party, or self-generated, datasets of surveillance data (e.g., RADAR or Automatic Dependent Surveillance-Broadcast (ADS-B)) (FIG. 2, 210-9) are collected to determine live flight paths of all vehicles (for which their transponders communicate with air traffic control) within respective voxels (cubes or otherwise-shaped geospatial areas of 3-dimensional space) over a set amount of time. The datasets for each of these voxels is aggregated, and a calculation for air risk for each leg of a flight may be determined.

In some embodiments, the surveillance data may be collected and/or processed in advance of any flight plan data being entered and may be stored in risk database 260 (or any other appropriate data repository), such that expected airspace density for any given voxel may be quickly referenced in a table or other appropriate data structure. In other embodiments, surveillance data may be collected and/or processed at the time flight plan data is entered or a risk assessment is requested by an operator or a flight planning module. Historic live flight path data may be aggregated over a set amount of time (such as 24-hours, a number of days or years, or any appropriate value). Position reports of aircrafts following those flight paths are aggregated or tallied, separate from individual flight identifiers, to determine an airspace density corresponding to a likelihood of collision. In some embodiments, the respective voxel areas are delineated in geoJSON format, by longitude, latitude, and altitude, or other appropriate delineations or identifications may be used in different embodiments. In one embodiment, the voxels are representative of cubes (or 3-dimensional squares or rectangles), that is, the airspace available to vehicles is gridded into cubes, however, in other embodiments, other appropriate shapes may be used, such as hexagonal 3-dimensional volumes, pyramids, etc. In some embodiments, the voxels may be any appropriate tessellating shapes, so that all areas under a flight plan are covered by one or more virtual spaces, however in other embodiments, the voxels may overlap or be separated by gaps.

In one embodiment, air risk model 254 divides the earth's airspace into a grid of voxels, or tiles, with dimensions of 0.01 degrees of latitude, by 0.01 degrees of longitude (about 1.11 km at the equator), though other sizes are possible in different embodiments. The air risk model 254 may acquire flight paths that pass through one or more of those gridded voxels. In some embodiments, the voxels may be similar or identical in size (e.g., 1.11 km×1.11 km) and in other embodiments, they may differ in size from each other. The air risk model 254 may in some embodiments aggregate and re-divide this data to create smaller or larger voxels.

Figure 4:
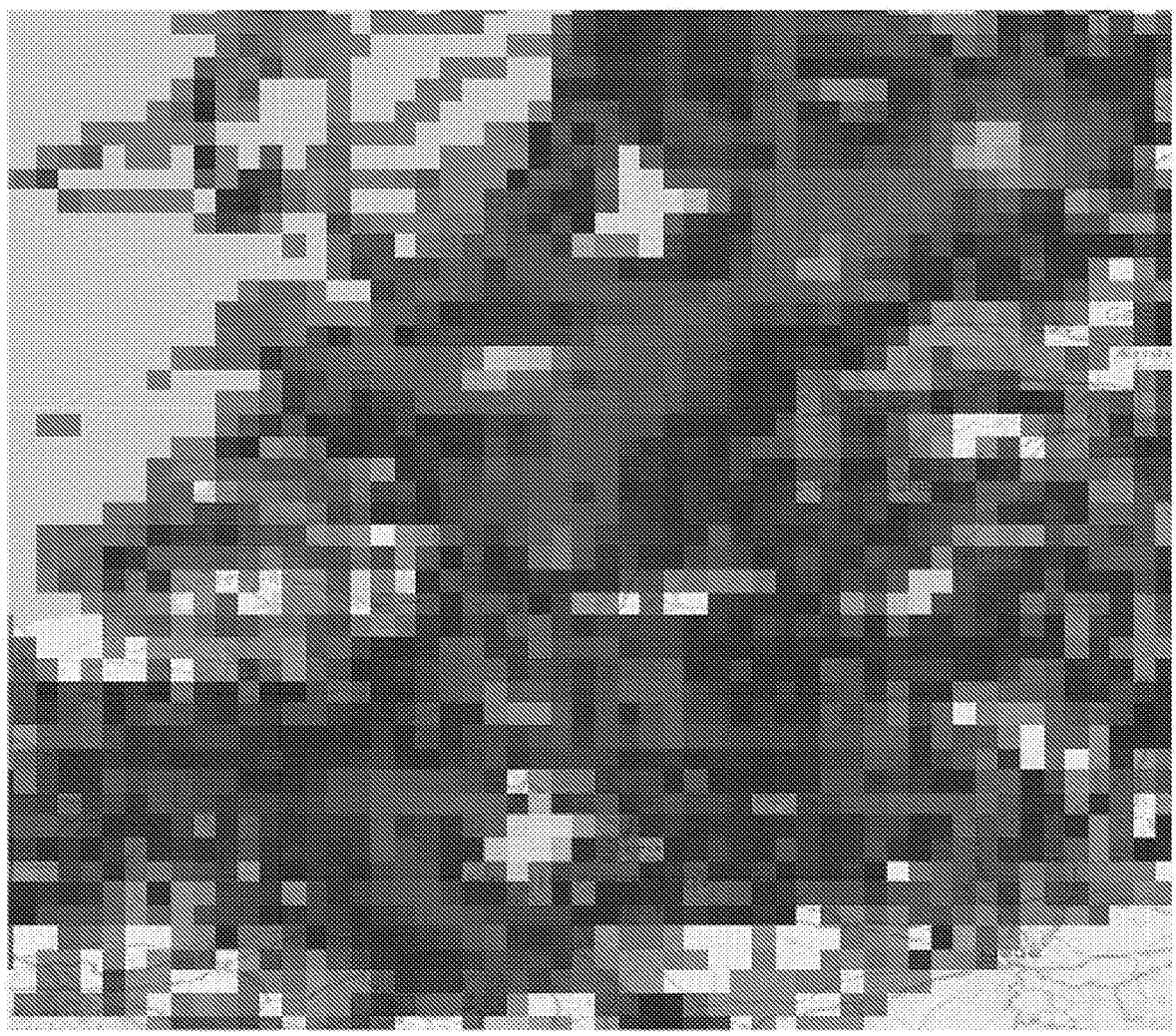
FIG. 4 is a diagram illustrating a density map generated by an air risk algorithm in accordance with some embodiments of the present disclosure.

All surveillance (e.g., RADAR or ADS-B aircraft positions) data is counted for each point (corresponding to a point at which an aircraft reported its position to an air traffic controller) within each voxel over a given timespan in order to generate a collision rate. In some embodiments, data associated with a single aircraft in a single voxel for a particular timeframe is considered together as a single flight, and is not uniquely aggregated. That is, a relatively slow-moving aircraft that reports its position multiple times within one voxel would count as a single aircraft, not multiple aircraft. In some embodiments, conversely, a relatively fast-moving aircraft that passes through a voxel but does not report its position while in the voxel space would not be counted within that voxel (zero aircraft would be recognized in that space in connection with that flight). Other embodiments may instead use interpolation of the aircraft's position based on a derived or reported ground speed, ascent/descent rate and track, and/or other characteristics, to determine all possible voxels through which the aircraft may pass, as described below. By aggregating the recognized flight data, an average number of flights that enter a voxel per time period can be determined. This value may be considered a "density" of the voxel, a collision rate, or an encounter rate (or may be used to calculate an encounter rate). The relatively density of different voxels may be aggregated together to form an air density map. A 2-dimensional illustration of a map of 3-dimensional voxels is illustrated in FIG. 4, with darker areas indicating areas of higher flight activity. FIG. 4 illustrates one view of an exemplary 3-dimensional air density map, and it may be generally understood that there may exist one or several 2-dimensional voxel layers that make up the full 3-dimensional airspace. In other embodiments, the encounter rate may be modified to account for changing traffic patterns by time of day, time of year, etc. For instance, in a voxel encompassing an airport, the hours during which the airport is open would have a higher encounter rate than when the airport is closed.

Figure 5A:
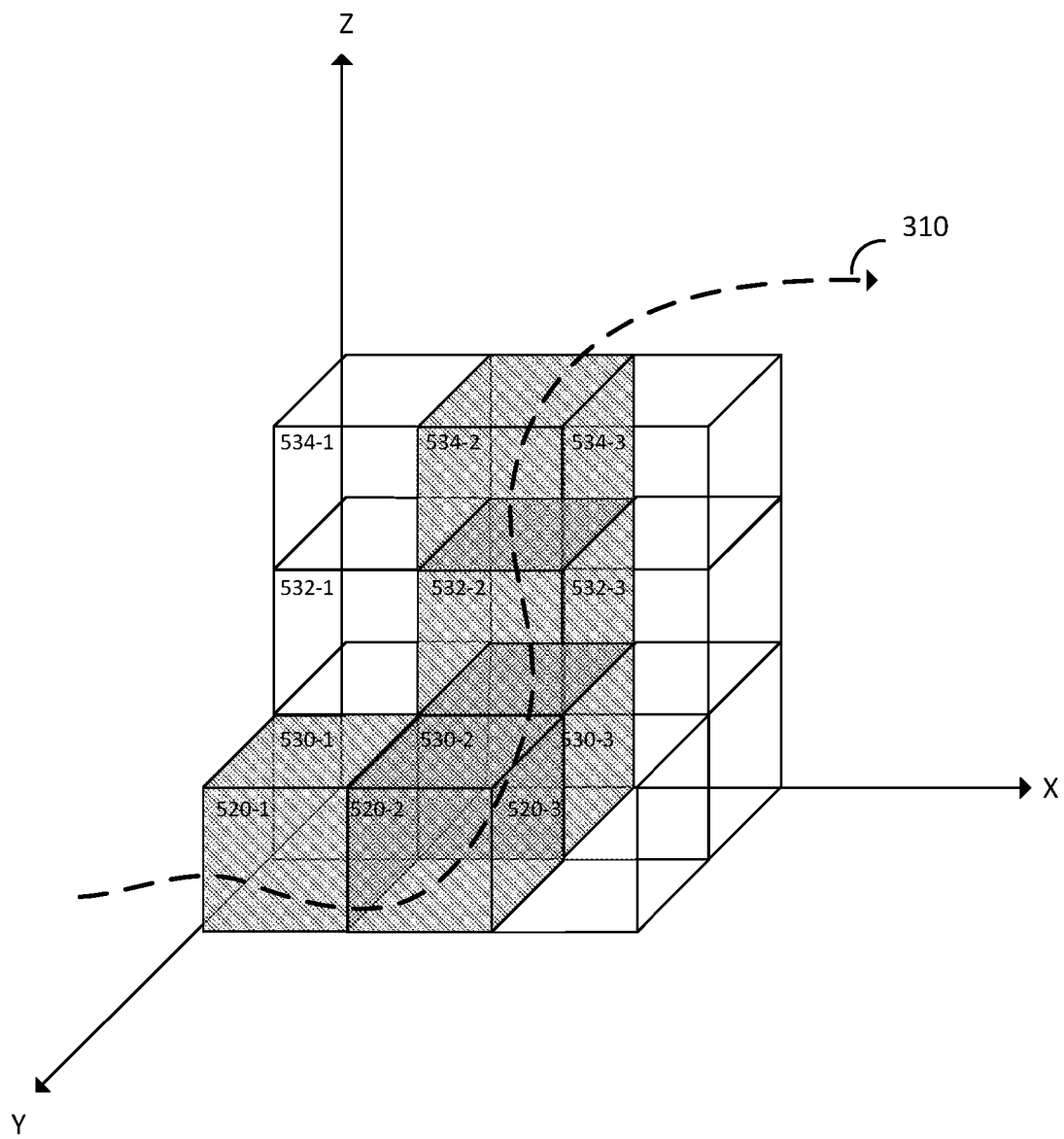
FIG. 5A is a diagram illustrating a calculation perform by an air risk algorithm in accordance with some embodiments of the present disclosure.

FIG. 5A illustrates a flight path 310 superimposed on a grid of voxel cubes, the voxels being positioned in two y-axis positions (those beginning with 520, and those beginning with 530, 532, 534), three x-axis positions (those ending in −1, those ending in −2, and those ending in −3), and three z-axis positions (those beginning with 520 or 530, those beginning with 532, and those beginning with 534). The flight plan 310 (provided by the operator via flight planning service 130 or another user interface) may be analyzed to determine which of these voxels (corresponding to respective 3-D airspace regions) will be passed through during flight, and/or may otherwise be in danger of collision based on a vehicle's altitude, speed, temporal conditions, and the like. In the embodiment of FIG. 3A, the voxels through which the flight path 310 passes are shown in gray, each tile indicating an area in which the vehicle may experience a risk of collision. The density datasets (of flight data density) for each of these voxels is aggregated, and a density value for each leg of a flight is determined. That is, in one embodiment, a total number of flights (per time period) is collected for each voxel and for the flight path (or a segment thereof) in its entirety.

Figure 5B:
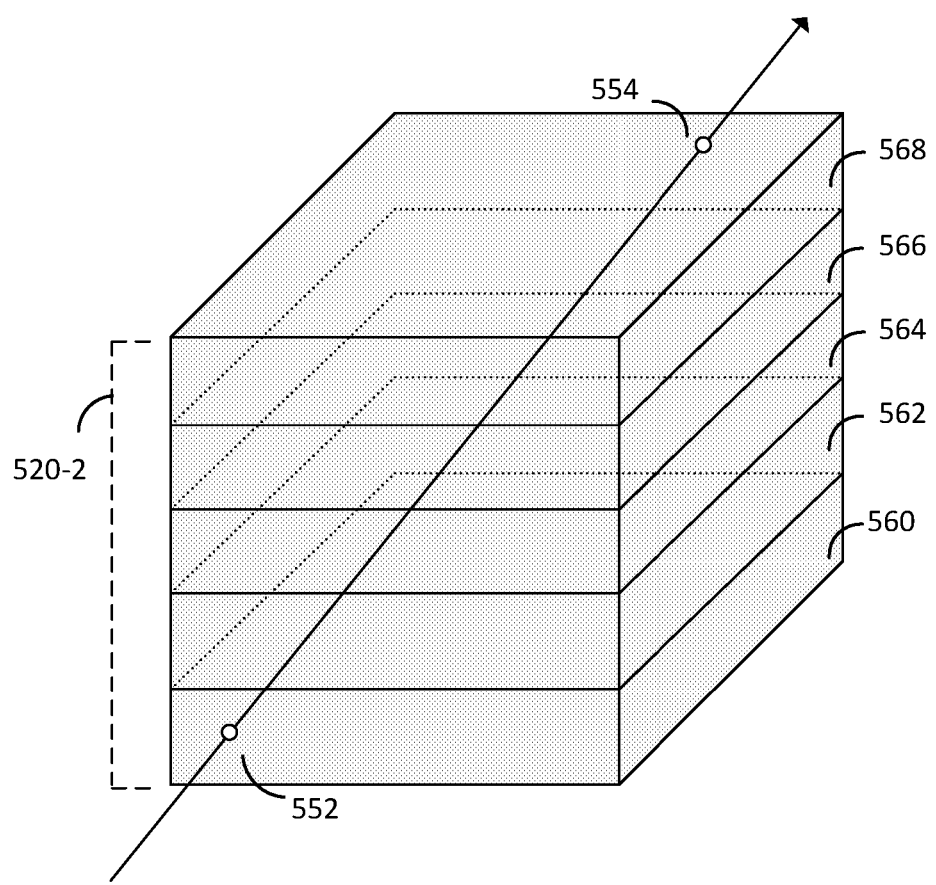
FIG. 5B is a diagram illustrating a calculation perform by an air risk algorithm in accordance with some embodiments of the present disclosure.

Air risk model 254 may also, in some embodiments, transform and/or process the surveillance data to achieve a comprehensive line of flying through which encounters may occur. For example, air risk model 254 may subdivide voxels into discrete bands delineated by altitude. In one embodiment, each altitude band is 100 feet high, creating a set of 5 sub-voxels for each voxel. FIG. 5B illustrates such a sliced voxel, with, e.g., five sub-voxels each 100 ft. high within the same tiled voxel, though other sizes or number of sub-voxels are possible in different embodiments. In FIG. 5B, two points of notification 552 and 554 are illustrated within the top and bottom sub-voxels 560 and 568, respectively. All surveillance (e.g., RADAR or ADS-B aircraft positions) data is counted for each point (corresponding to a point at which an aircraft reported or notified its position to an air traffic controller) within each voxel over a given timespan. In one embodiment, this is a 10-ms timespan, therefore, the flight path is divided in 10 ms steps. For each step, it is determined which sub-voxel and altitude is occupied at that time stamp. For each period between the points of notification, it can be assumed that the flight passed through the intermediate space, in FIG. 5B, each of sub-voxels 562, 564, and 566. Therefore, with reference to FIG. 5B, the air risk model 252 would record, not only the sub-voxels 560 and 568 corresponding to points 552 and 554 but also the middle three sub-voxels 562-566 as well. Similarly, if the second point of notification 554 were located in sub-voxel 566 instead of 658, the air risk model 252 would record sub-voxels 560 and 566 and intermediate voxels 562 and 564, but would not record sub-voxel 568. Accordingly, in the exemplary embodiment, air risk model 254 may focus on only ranges of altitudes through which an aircraft has passed. For example, because of the subdivision, aircraft limited to low altitude travel may focus only on the sub-divisions in the lower altitude areas, reducing the amount of airspace data that must be analyzed and processed.

Air risk model 254 may also, in some embodiments, transform the data identifying each occupied voxel through the application of a Poisson distribution, i.e., expressing the probability that an encounter will or will not occur within the given voxel. probability. The probability that there will not be an encounter in a given voxel i during t units of time (t being the length of time the vehicle spends in the voxel), with arrival rate $r_i$ (aircraft occupancy rate for the voxel) per unit of time, may be determined, in some embodiments, by the following formula:

$$P_i(t) = \exp\{-r_i t\} = \text{Prob}[0 \text{ arrivals}] \qquad \text{[Equation A-1]}$$

The total probability of collision for the flight path is calculated with the following equation:

$$P_{collision} = 1 - \prod_{i=0}^{n} P_i(t_i) = 1 - \exp\left\{-\sum_{i=0}^{n} r_i t_i\right\} \qquad \text{[Equation A-2]}$$

In some embodiments, air risk model 254 may also calculate the total period T during which voxel occupancy data is collected/compared. The number of arrivals $x_i$ occurring within an $i^{th}$ voxel is assumed to follow a Poisson distribution with mean $T \times r_i$, where $r_i$ is the historic arrival rate of fights per unit time T. The estimated arrival rate of another aircraft within a voxel may therefore be calculated as:

$$\hat{r}_i = x_i / T \qquad \text{[Equation A-3]}$$

In an alternate embodiment, the air risk model 254 may, additionally or alternately, use the following equation to calculate an airspace encounter rate in a given voxel:

$$P_i(t) = 1 - e^{-r_i t} \qquad \text{[Equation A-1-2]}$$

where $r_i$ is a stored aircraft occupancy rate for the voxel, and t is the length of time the vehicle spends in the voxel. The air risk model 254 may further alternately (or additionally) use the following equation to calculate an airspace encounter rate over the entirety of the flight path:

$$P_{collision} = \prod_{i=0}^{n}(1 - P_i(t_i)) \qquad \text{[Equation A-2-2]}$$

Additional or alternative calculations performed by air risk model 254 are described in "A Quantitative Framework for UAV Risk Assessment," Peter Sachs, Version 1.0, Sep. 13, 2018, the entirety of which is incorporated by reference herein.

In some embodiments, where required by a particular risk assessment framework, the calculated air risk value (which may be, in some embodiments, an encounter likelihood or percentage) associated with each segment of a flight path may be correlated to an air risk class (ARC). For purposes of example, where an implementation of the SORA framework is used in the software 270, and where the calculated air risk value is an affected number of people along the flight path route, the air risk value for the flight path (or for a segment of the flight path) may be matched to one or more air risk classes (e.g., <1e-6 encounters per flight hour may be mapped to "atypical airspace," though any appropriate value, such as <1 e-4 encounters per flight hour, may be used in different embodiments). In one embodiment, this association of air risk categories may be done by air risk model 254 with reference to a predetermined table stored in risk database 160. Of course, other breakdowns of air risk categories, no correlation to categories, and/or a direct use of the calculated air risk value may be used in different embodiments.

In some embodiments, a particular risk assessment software 270 (such as, e.g., an implementation of SORA) may require consideration of a ground risk and an air risk, which values are determined by the ground risk model 252 and the air risk model 254 respectively. In one embodiment, a SAIL value can be determined based on a lookup of a ground risk class and an air risk class association. That is, for each combination of ground risk class and air risk class, an associated SAIL score may be found with reference to a predetermined table stored in risk database 160.

Using a SORA framework as an example, traditionally, a SORA determination of SAIL level requires inputs of: the type and sub-type of the aircraft (e.g., types including fixed wing, multicopter, e-VTOL and sub-types such as manufacturer and model), the operating regime for the flight (e.g., visual line or sight (VLOS), beyond visual line of sight (BVLOS), etc.), the density of the environment over which the flight will occur, the type of the airspace and the altitude of flight, and any mitigations the operator has implemented. Traditionally, such values may be input into a (wholly or partially qualitative) checklist, the output of the checklist being a SAIL level assigned to a flight (or a segment of a flight). SAIL levels range from I to VI, with higher levels requiring the operator to provide documentation or evidence demonstrating more robust maintenance and operational procedures. A SAIL level may not specifically correspond to a quantitative suggestion of collision, such as with the ground, people, or another aircraft. However, by use of the systems and methods described herein, the amount of input required from an operator is reduced in comparison to the traditional qualitative frameworks, as the systems described herein may in some instances require reduced input, such as only a type of vehicle and a flight plan, or inputs that may be collected through automated rather than manual means. In the embodiments described herein, outputs similar or identical, or functionally identical, to those provided by a qualitative frame, can be reached through the application of quantitative data that can be gathered in a repeatable, consistent manner from a defined source that may be evaluated for data integrity and/or certified. In addition, even where subjective, or changeable/qualitative values are input, the values can be parameterized so as to contribute in a numerical risk calculation. In an exemplary embodiment, where consistent inputs of the same (or similar) values are input, the outputs of the systems may be understood to be predictable and repeatable in nature.

Further, looking once more to the traditional SORA framework for risk, the assignment of SORA's SAIL level does not correspond to an immediate flight authorization. Rather, in a traditional risk assessment, a regulatory or airspace service provider may require that flight plan requests be submitted well in advance (e.g., several days in advance) of a mission to give a human specialist time to manually review the request. The regulator may issue a conditional approval, or may ask for more information. In particular, process may allow the operator to adjust their flight time to occur during more favorable wind conditions, and to ensure their battery is sufficiently charged for the duration and profile of the mission. Accordingly, in such traditional implementations, factors such as an existing battery charge may in some cases be assumed to be in an ideal state, an assumption that may not reflect the reality of the vehicle's condition. The systems and methods described herein allow for risk calculation to be handled immediately or shortly before takeoff, considering the actual, temporal conditions, without such assumptions.

Turning once more to FIG. 2, temporal risk model 256 may calculate whether and the degree to which any temporal data, such as weather and/or vehicle condition data are relevant to the determination on risk of the flight plan. Temporal data may be data collected from any of data sources 210, operator 110, or the aircraft (or other sources). Such data may be collected in real-time or aggregated from a set, recent period of time, e.g., the previous hour, 24-hours, 7 days or the like). In some embodiments, temporal risk model 256 may determine the period of time for which to aggregate temporal data based on the type of risk being calculated. In some embodiments, temporal risk model 256 may implement one or more of a weather risk calculation, dependent on temporal weather data, a vehicle risk model, based on the current vehicle health and maintenance history of the aircraft, or a battery risk model, dependent on the current battery health.

In an exemplary embodiment, a battery risk model may be included in the temporal risk model 256, where the battery risk model obtains and considers data such as, e.g., starting battery voltage, flight plan characteristics, length of the flight, the percentage of preprogrammed or manual flight, hardware faults, and the like. In some embodiments, the battery risk model may apply a weighted consideration of such factors. In one exemplary embodiment, the battery risk model of the temporal risk model 256 may use the following equation to calculate a risk of battery failure during the flight:

$$R\overline{battery} = -12{,}180 + 1.98 IV + 1.67 \times 10^{-1} D - 7.68 \times 10^{-1} V_e - 4.86 \times 10^{-3} A - 121 Du. \quad \text{[Equation B-1]}$$

where IV is an initial battery voltage measurement (in millivolts), D is a total Haversine distance that the vehicle will travel (in m), $V_e$ is an average total velocity for the flight (in km/sec), $D_u$ is a total flight time (in min), and A is a difference between a highest and lowest planned altitude (in mm). Of course, other embodiments may use different weightings or different formulas.

In some embodiments, the battery risk model's calculation may result in the determination of a numerical ending battery voltage. In some embodiments, this projected ending voltage may be mapped onto a graph of overall flight risk. For instance, the projected battery voltage may be correlated to one or more groupings, or set against a curve, where particular groupings or ranges of voltage value contribute to the overall flight risk in greater quantities (e.g., a significantly low ending voltage may greatly increase risk, where a moderately low ending voltage may not impact risk at all).

Turning once more to FIG. 2, in some embodiments, a pilot risk is calculated by pilot experience model 258. In such embodiments, pilot risk model 258 may consider, e.g., a total number of hours the pilot has flown, the pilot's drone experience (if applicable), a percentage of managed vs. autonomous flight, the training experience of the pilot/operator, a certification status of the pilot/operator, a registered proficiency of the pilot/operator, temporal conditions (e.g., weather), vehicle conditions (e.g., maintenance or performance history), and/or jurisdictional requirements of the area(s) over which the vehicle is intended to be flown, and the like. In some embodiments, the pilot risk model may apply a weighted consideration of such factors. The pilot risk model may then project an estimated percentage risk of collision based on the pilot's experience. As one exemplary method of calculation, the following equation may be used to determine pilot risk:

$$R\text{pilot} = (tm \times Fm) + (tp \times Fp) \quad \text{[Equation P-1]}$$

where tm×Fm is a percentage of time (or weighted percentage of time) the pilot has spent operating an aircraft in a manual mode, and tp×Fp is a percentage of time (or weighted percentage of time) the pilot has spent operating an aircraft in a flight mode (or autonomous mode). Of course, different equations or different weightings may be variously used in different embodiments.

In some embodiments, this projected pilot risk may be mapped onto a graph of overall flight risk. For instance, the pilot's flight hours may be correlated to one or more groupings or buckets, or set against a curve, where particular groupings or ranges of hours fall into different groupings that contribute differently to the overall flight risk. In some embodiments, the user enters this information. In other embodiments, such information may potentially be gathered automatically, for example through a pilot of training registry, through data stored on a drone registered to the pilot, through assumptions based on maintenance conducted on the vehicle, and other facts.

In some embodiments, a total risk score can be found by averaging (or otherwise aggregating) the percentage risks of each of the output risk scores from models 252-258 in FIG. 2. In other embodiments, a weighted application of the different output risk scores from models 252-258 may be applied, with different types of risk being weighted more heavily or lightly than others. Another embodiment may apply a machine learning algorithm, where the particular weights applied to different risks are determined based on learned flight, geospatial, and/or temporal conditions. In one example, at certain times of the year where the probability of storms is higher, the output of a weather risk model may be weighted comparatively higher. Other embodiments may use still other methods of calculating risk.

Figure 6:
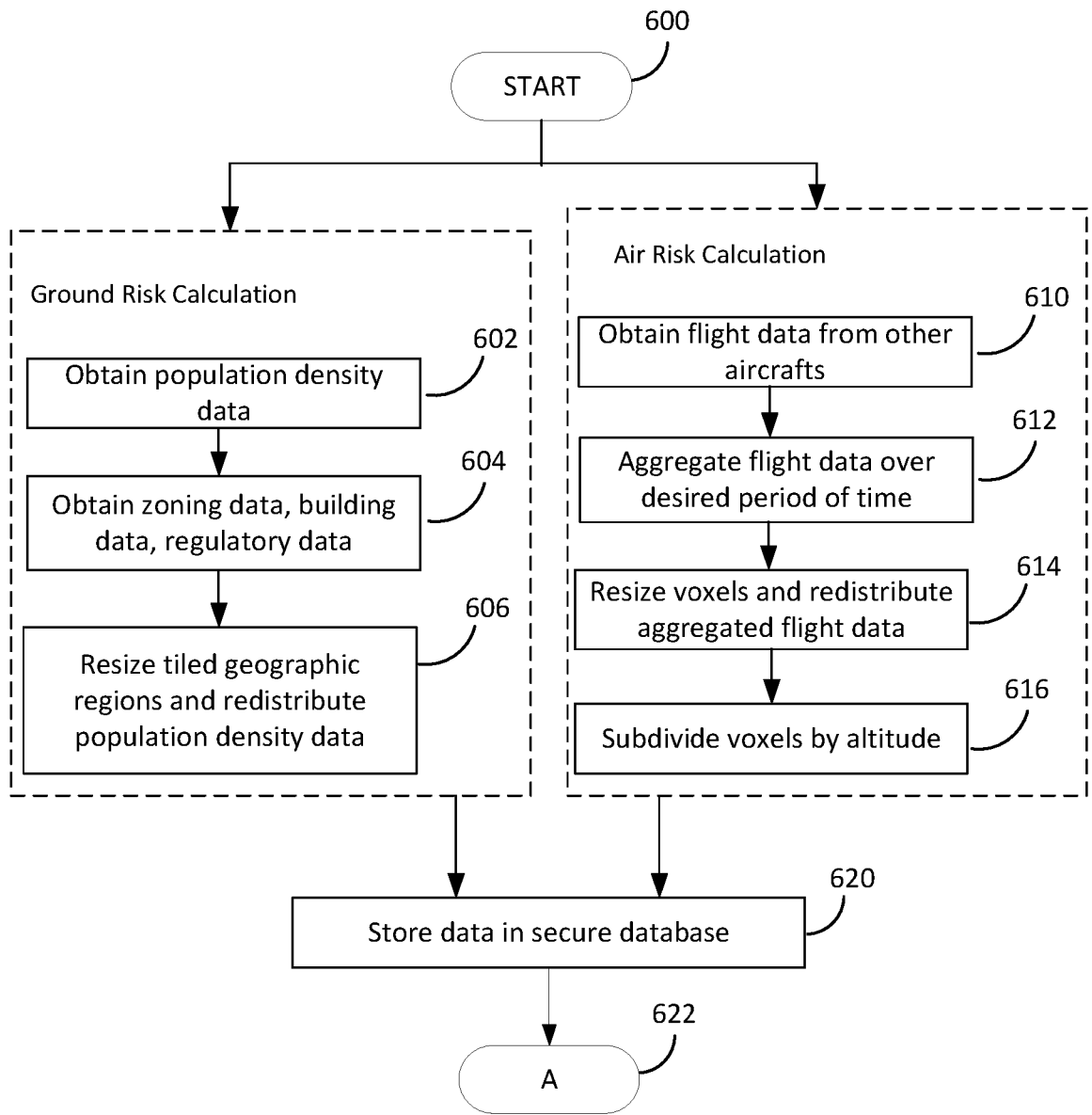
FIG. 6 is a flow chart illustrating a method performed by a risk management system in accordance with some embodiments of the present disclosure.

FIG. 6 is a flow chart illustrating a process followed by a safety risk management system in advance of receiving a flight plan from an operator of an aircraft. The process begins at Step 600, and flows to both a ground risk calculation process and an air risk calculation process (that is, both steps 602-606 and 610-616) are performed in parallel. In other embodiments, these processes may occur serially or in another distributed manner. Ground risk calculation is performed by a ground risk model of a risk assessment system. Initially, population density data (typically data such as from LandScan or another source) is obtained from a third-party source (Step 602). This data encompasses density data for the entire surface area of the Earth, divided into a gridded layout (e.g., square tiles). In addition, other information relevant to understanding the geospatial layout of the surface area of the earth, such as zoning data, building regulatory data, and the like (Step 604). The ground risk calculation may in some embodiments aggregate and re-divide this tiled data to create smaller or larger virtual squares, to more or less granularly reflect population data in more or less populated areas (Step 608). Each respective virtual space (tile) may be stored, in association with a population density value in a secure database (though in some embodiments, the database need not be secured) (Step 620). In parallel to the previous process(es), the air risk calculation includes the obtaining of flight path data (e.g., ADS-B data) (Step 610). This flight data is collected for a set period of time (in one embodiment, 15 days), and aggregated for that time period (Step 612). The air risk calculation may involve the resizing and redistribution of historical flight data, for example to provide more or less granular breakdowns of 3-dimensional airspace (voxels) to reflect areas of greater flight concentration (e.g., near airports) (Step 614). Further, each voxel is subdivided by altitude (Step 616) to allow for focus onto particular altitude in connection with particular types of aircraft. This data is also stored in a secure database (Step 620). The process then proceeds to point A, shown in FIG. 7, after which a flight plan is received from an operator.

Figure 7:
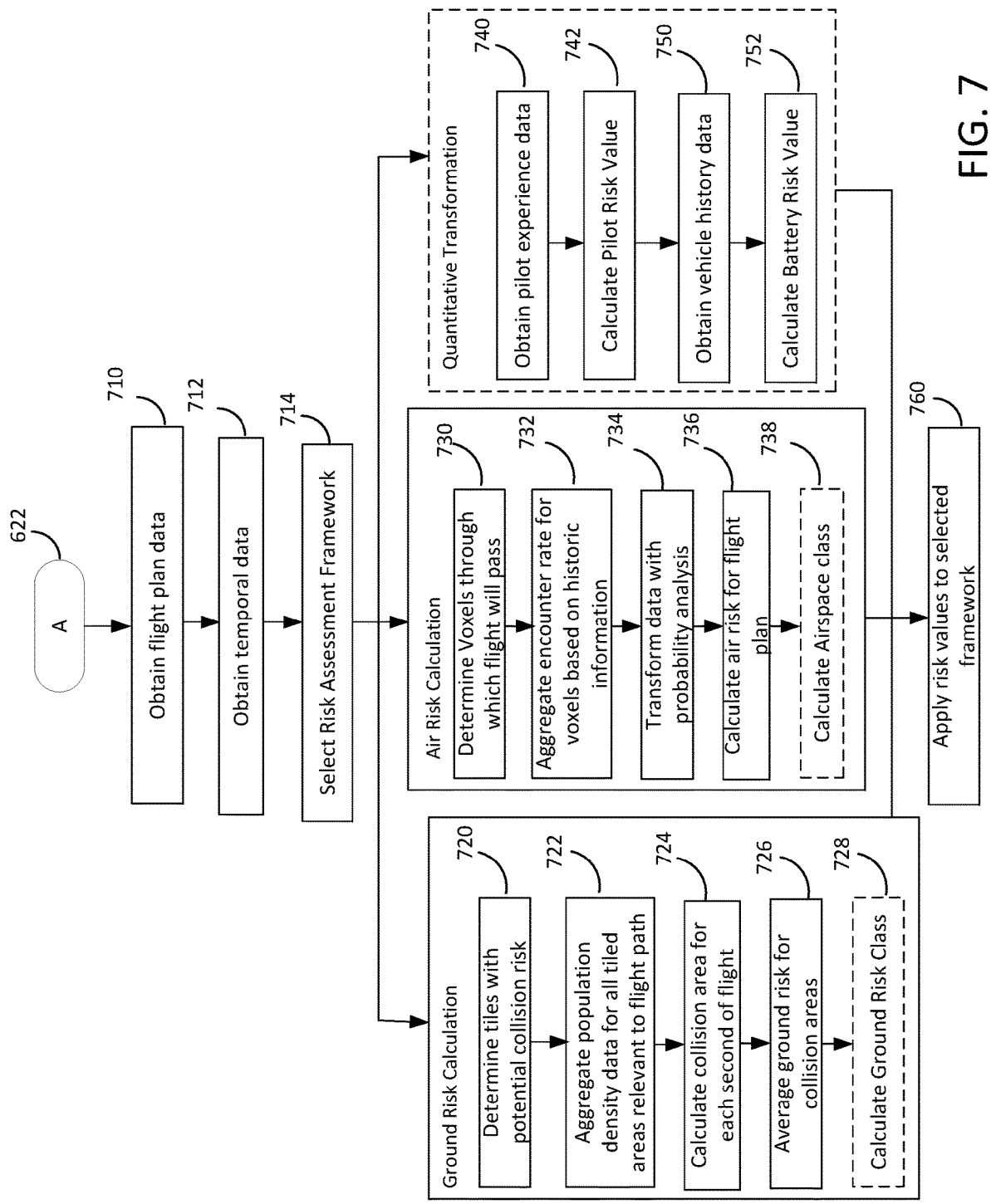
FIG. 7 is a flow chart illustrating a method performed by a risk management system in accordance with some embodiments of the present disclosure.

FIG. 7 illustrates one exemplary embodiment of a process performed by a risk management system after obtaining a detailed flight plan from a flight operator. At step 710, the risk management system obtains the flight plan from a flight planning service or through another (e.g., cloud-based) user interface. The risk management system then accesses one or more third-party sources to obtain temporal data such as, e.g., weather data, event data, vehicle operation history data, vehicle maintenance data, and/or other data that may change on a daily or hourly basis (Step 712). At step 714, the risk assessment service selects a framework to apply to the flight plan. In some embodiments this may be a defined framework (such as SORA) or a customized framework. The process of FIG. 7 thereafter proceeds to each of steps 720, 730, and 740, that is, each of the ground risk calculation (beginning at step 720), air risk calculation (beginning at step 730), and other quantitative transformation (e.g., temporal risk calculation, pilot risk calculation) (beginning at step 740) may occur in parallel. In other embodiments, these processes 720-740 may occur serially or in another distributed manner.

In the ground risk calculation, the process begins by the identification of the geospatial tiles for which a potential collision risk from the flight exists (Step 720). This may be done by determining the tiles directly below the flight path, and in some embodiments, adjacent or nearby tiles that may be affected based on temporal conditions (e.g., weather, weight and size of aircraft) and assessment preferences (e.g., less tolerance for risk). In step 722, the ground risk calculation aggregates the population density for all the relevant tiles with a risk of collision. For each one-second (or alternately-timed) interval of the flight as it is set out by the flight plan, an altitude-dependent calculation is performed to done to determine a vehicle's affected ground area (Step 724). The stored population density for the respective ground areas and ground risk is calculated. A calculated aggregate value of these points (e.g., average value) may be taken as the ground risk value (Step 726). In some embodiments, where required by the selected risk platform, the calculated ground risk value may be used to determine a ground risk class (Step 728, shown in dotted lines to indicate its optionality).

In the air risk calculation, the process begins with the identification of the voxel spaces through which the aircraft will pass in accordance with the intended flight plan (Step 730). In step 732, the air risk calculation aggregates the air density (number of flights in the airspace) for each voxel. This data is aggregated and transformed into a probability of collision based on a Poisson distribution (Step 734). This probability value may in some embodiments be used as an air risk value (Step 736). In some embodiments, where required by the selected risk platform, the calculated air risk value may be used to determine an air risk class (Step 738, shown in dotted lines to indicate its optionality).

Other quantitative transformations may additionally be performed. For instance, data related to the experience or training of a pilot of the aircraft, such as a total number of hours the pilot has flown, the pilot's experience with this particular drone (if applicable), a percentage of managed vs. autonomous flight, the training experience of the pilot/operator, a certification status of the pilot/operator, a registered proficiency of the pilot/operator, temporal conditions (e.g., weather), vehicle conditions (e.g., maintenance, performance), and/or jurisdictional requirements of the area(s) over which the vehicle is intended to be flown, and the like, are obtained from the temporal data (Step 740) and used to calculate a pilot risk value (Step 742). Similarly, data relating to battery risk, such as starting battery voltage, flight plan characteristics, length of the flight, the percentage of preprogrammed or manual flight, hardware faults, and the like, may be obtained from the temporal data (Step 750) and used calculate a battery risk value (Step 752).

One or more of these risk values, including a ground risk, an air risk, a pilot risk value, and a battery risk value (among other risks, in some embodiments) may be applied to the selected framework (Step 760) to output, e.g., a risk report, a risk score, one or more risk recommendations, and/or an approval or denial for flight.

Figure 8:
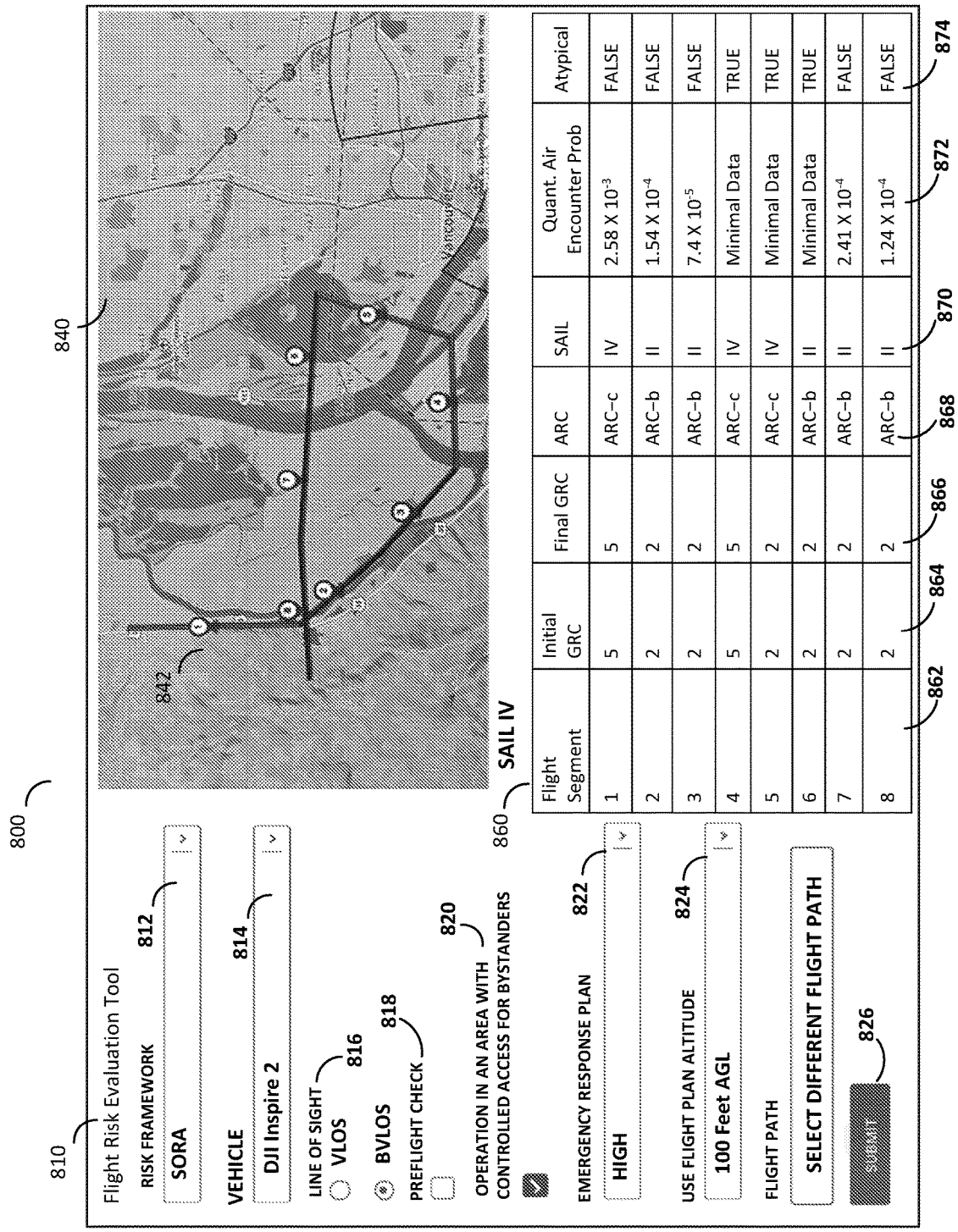
FIG. 8 is a diagram illustrating a software tool for risk management in accordance with some embodiments of the present disclosure.
Figure 1:
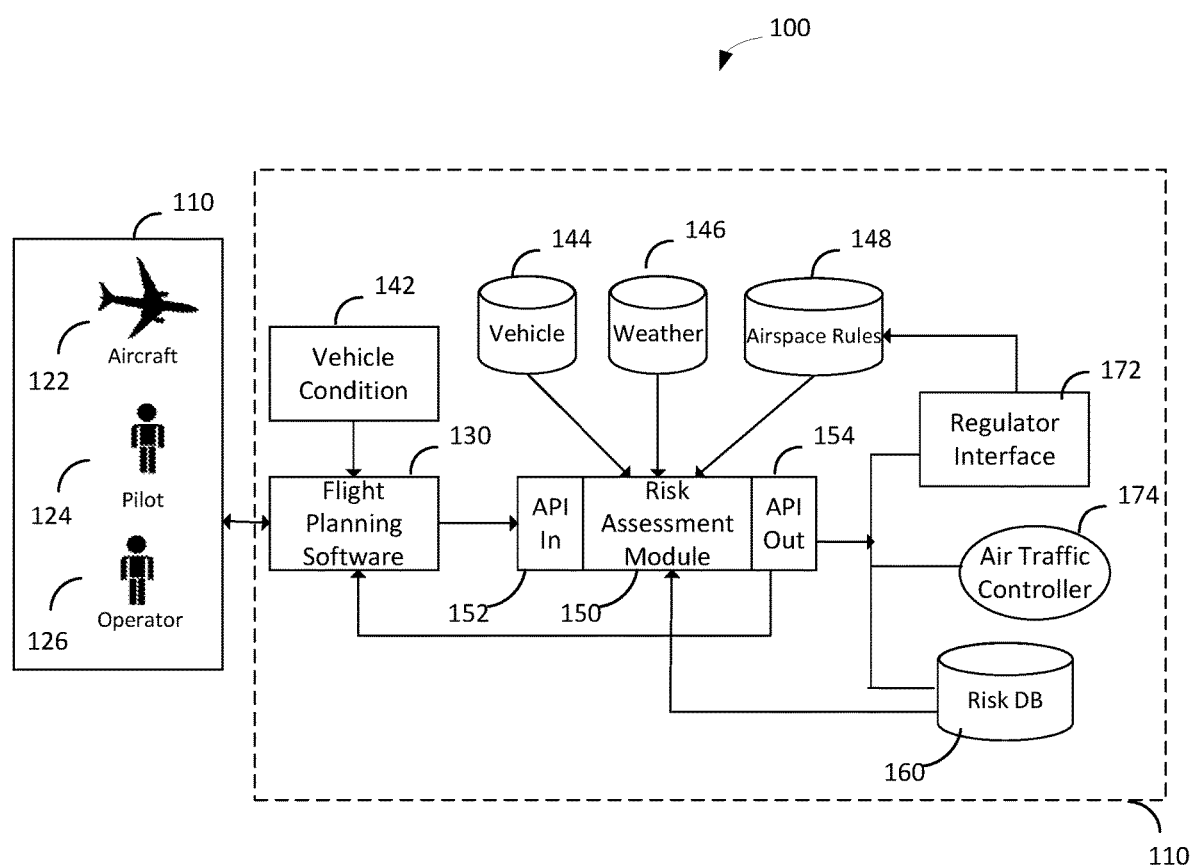
Figure 2:
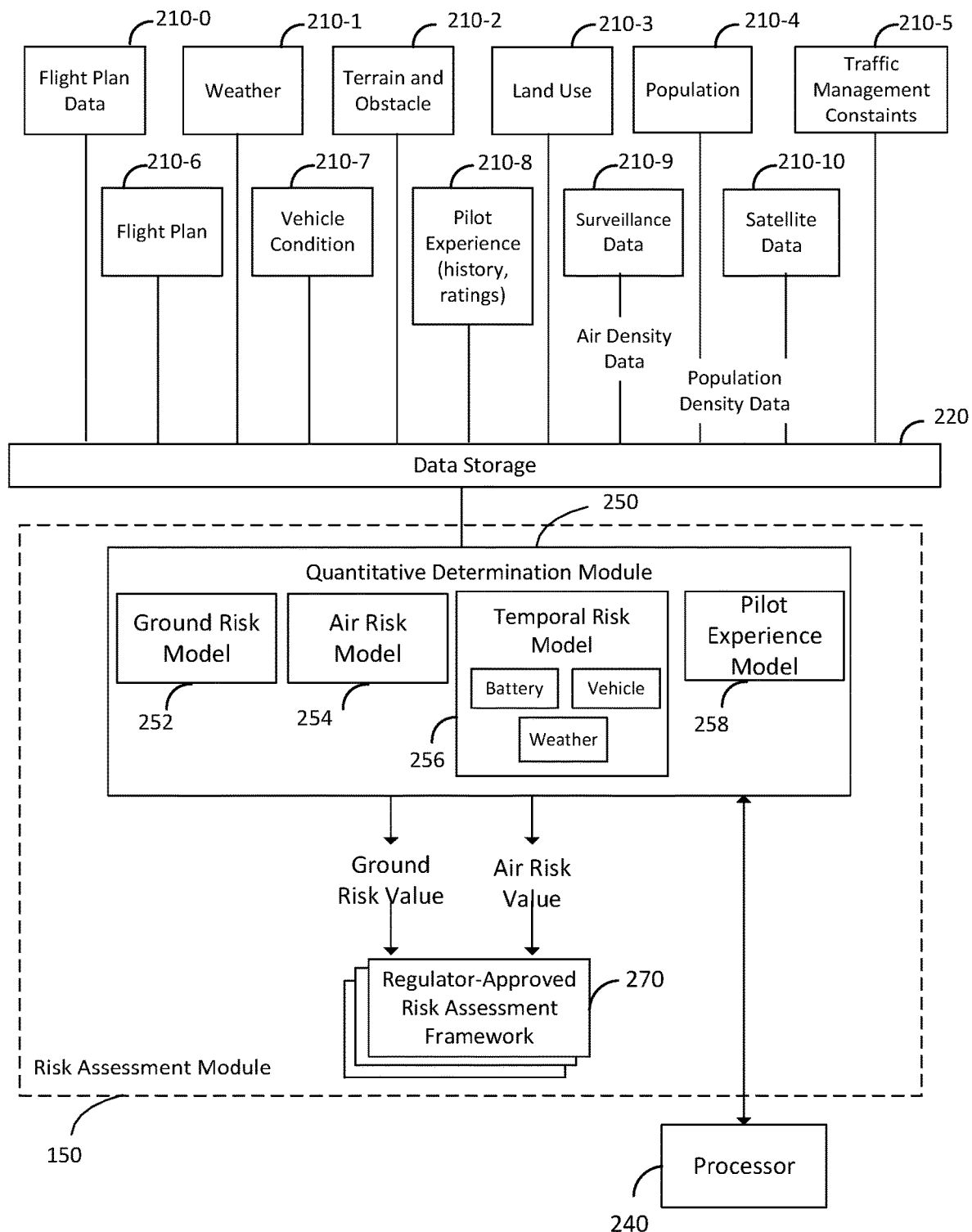
Figure 3A:
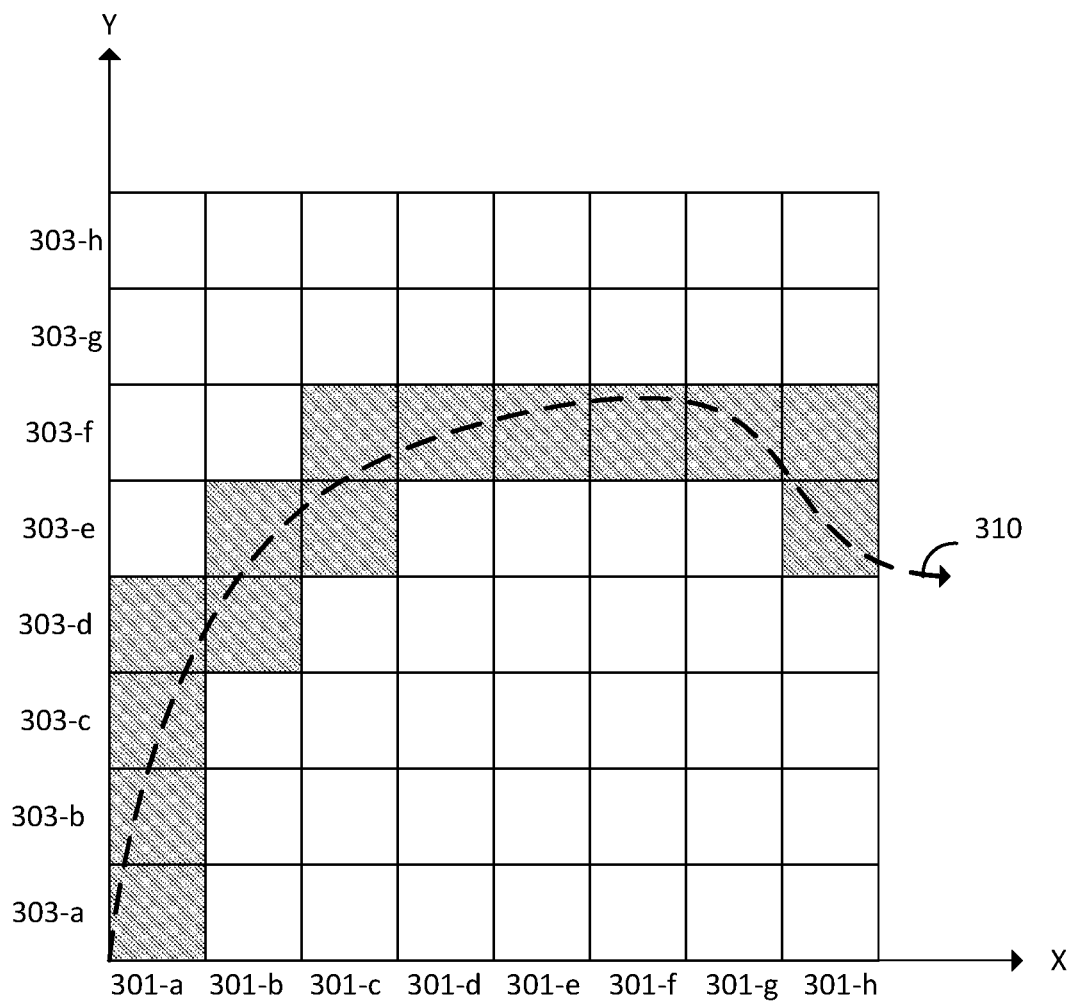
Figure 3B:
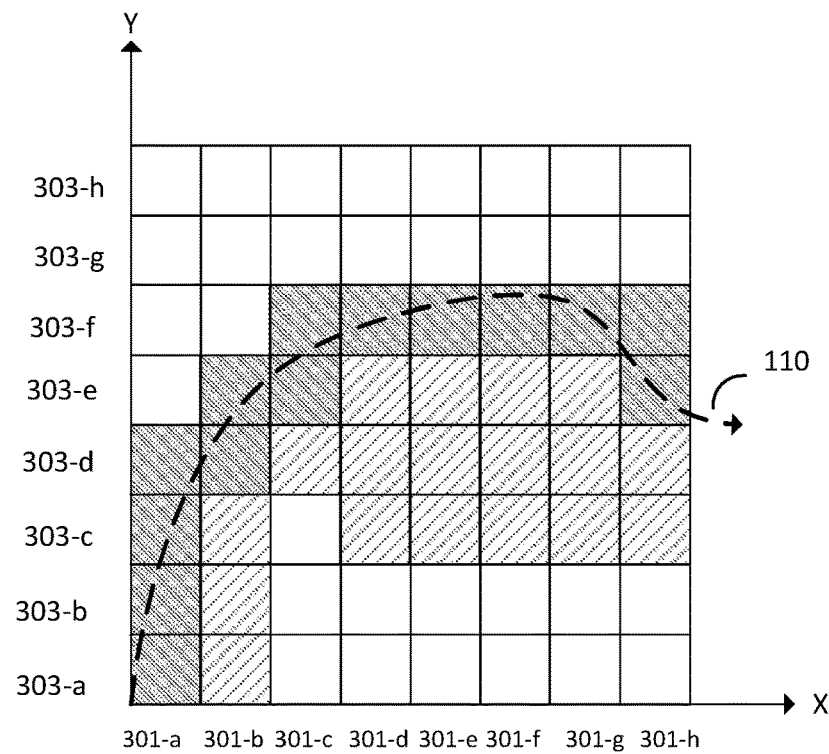
Figure 3C:
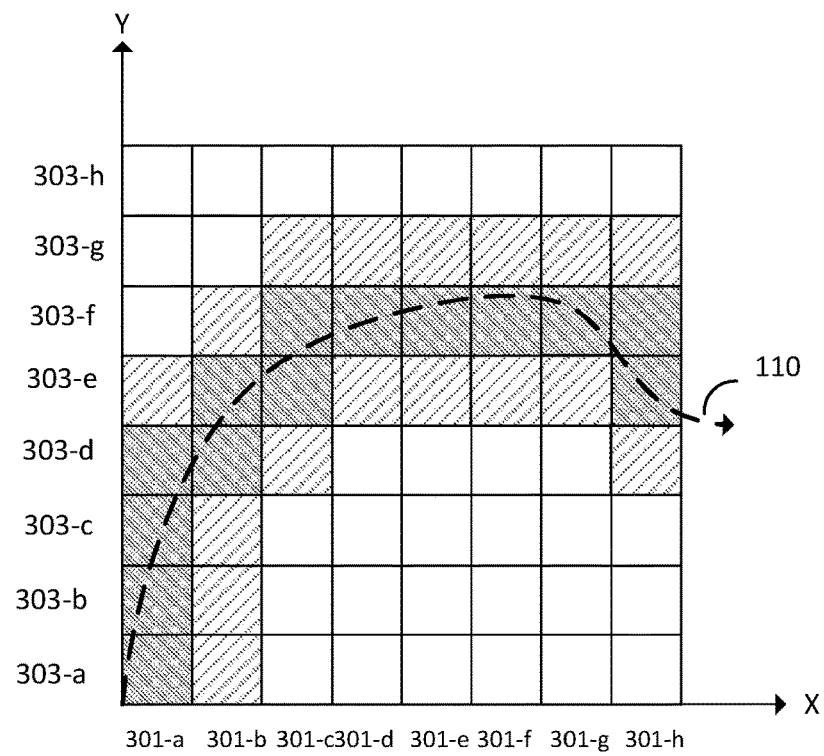
Figure 4:
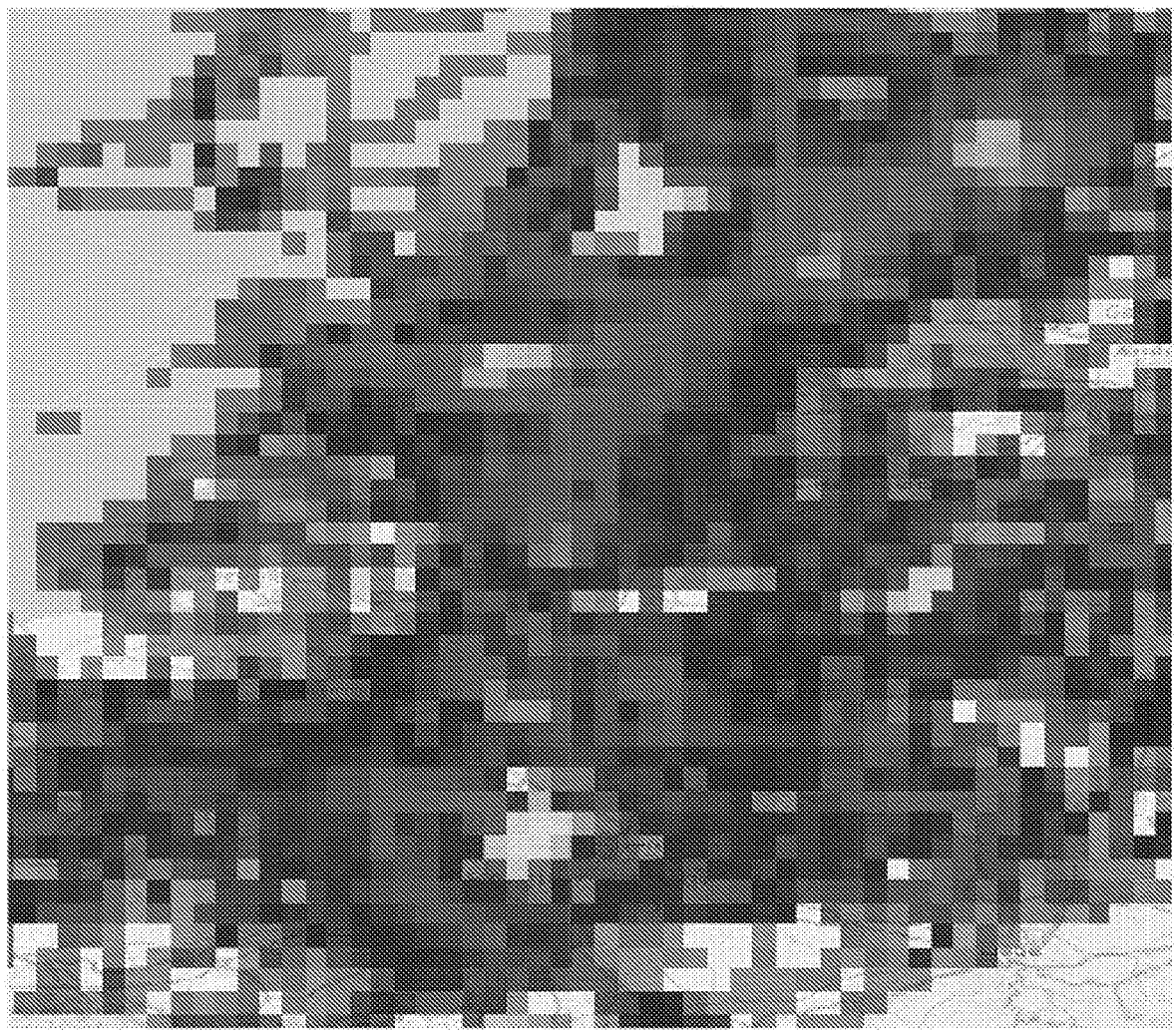
Figure 5A:
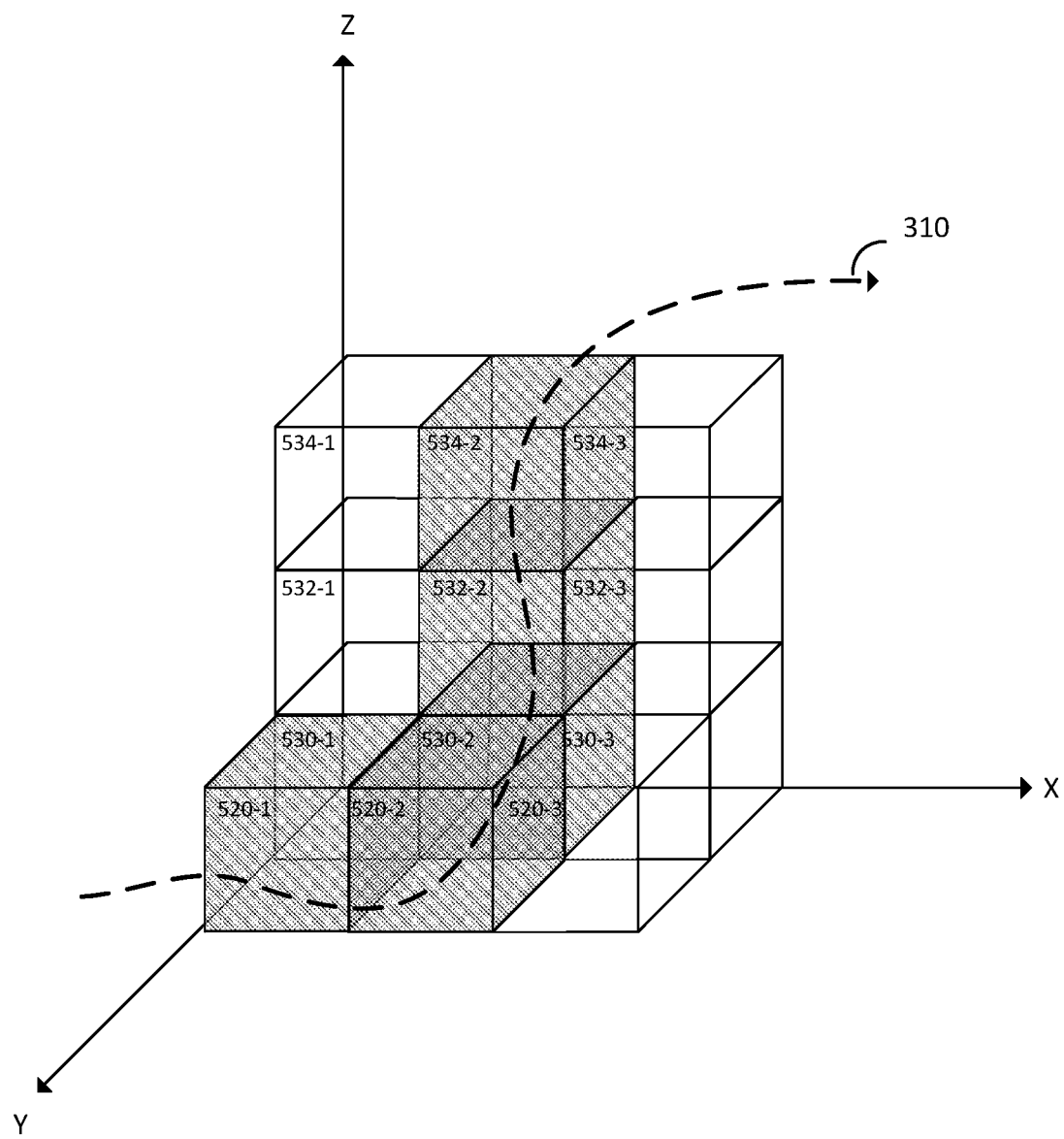
Figure 5B:
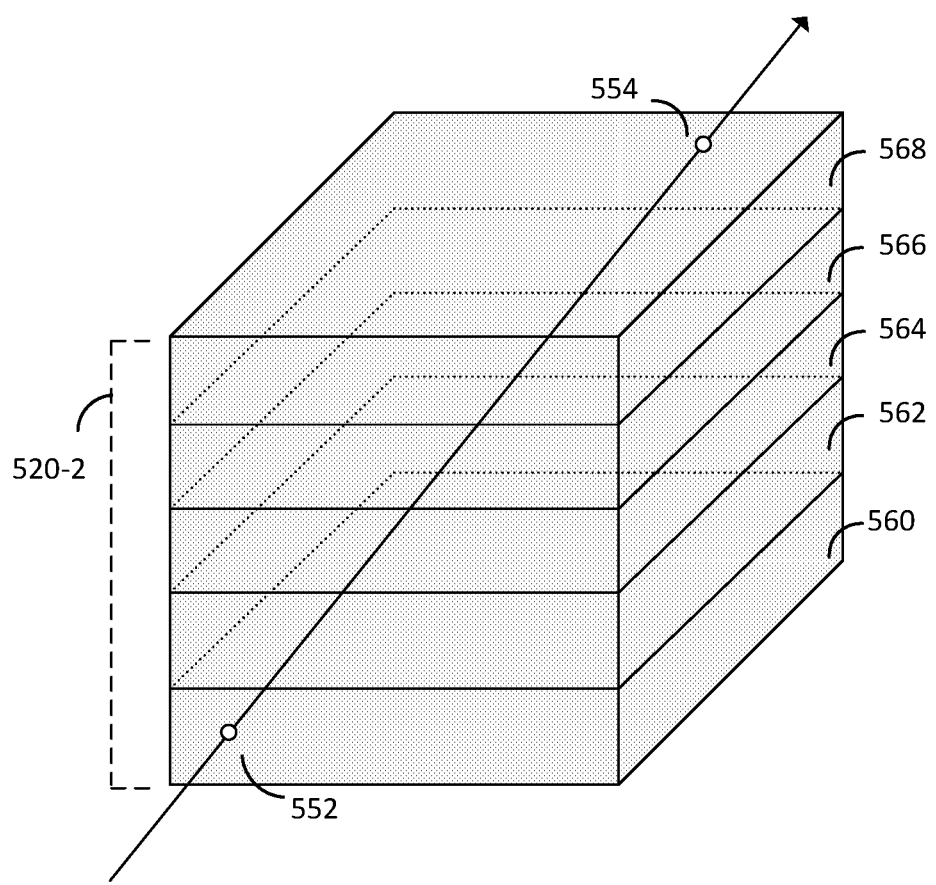
Figure 6:
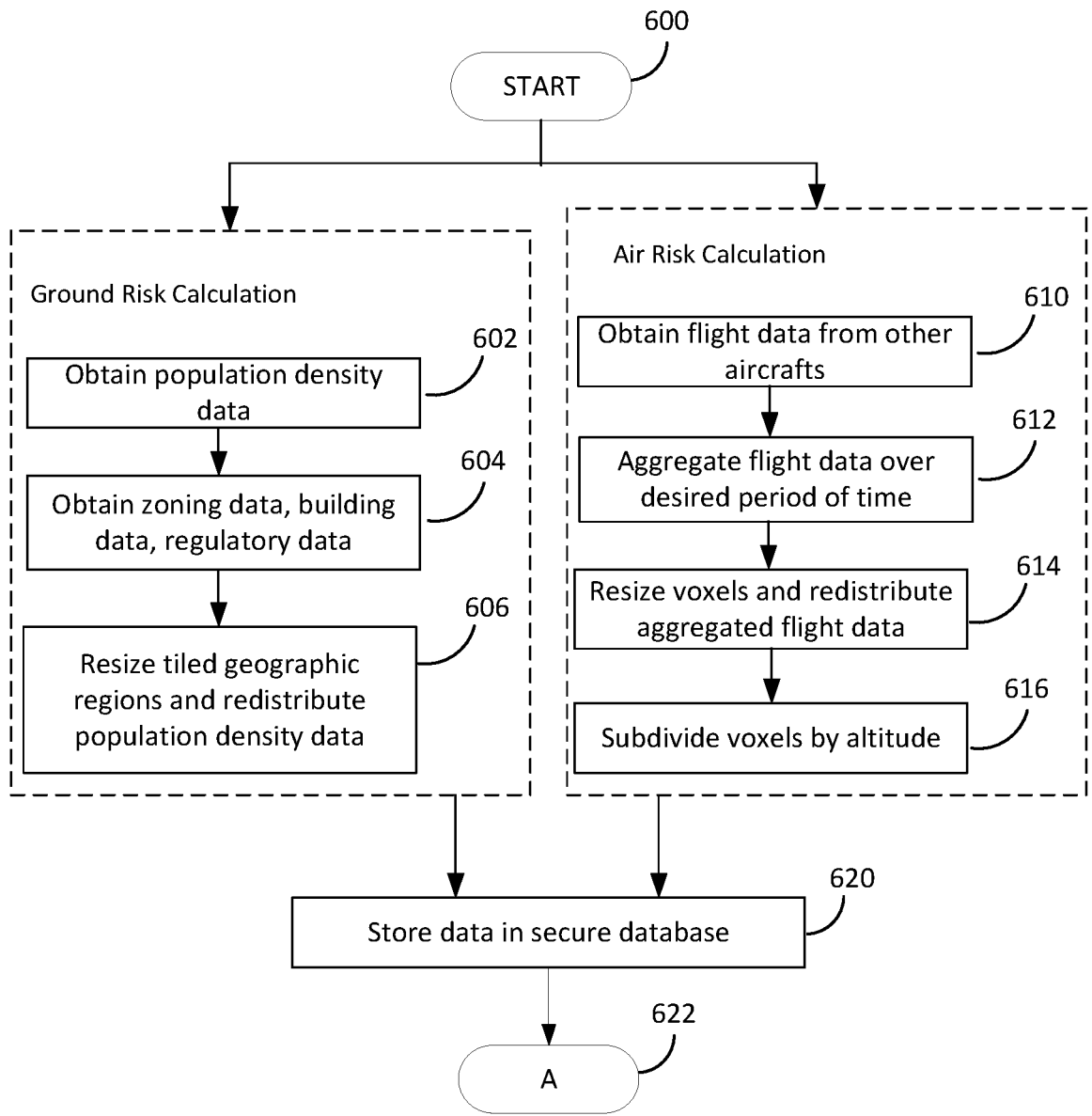
Figure 8:
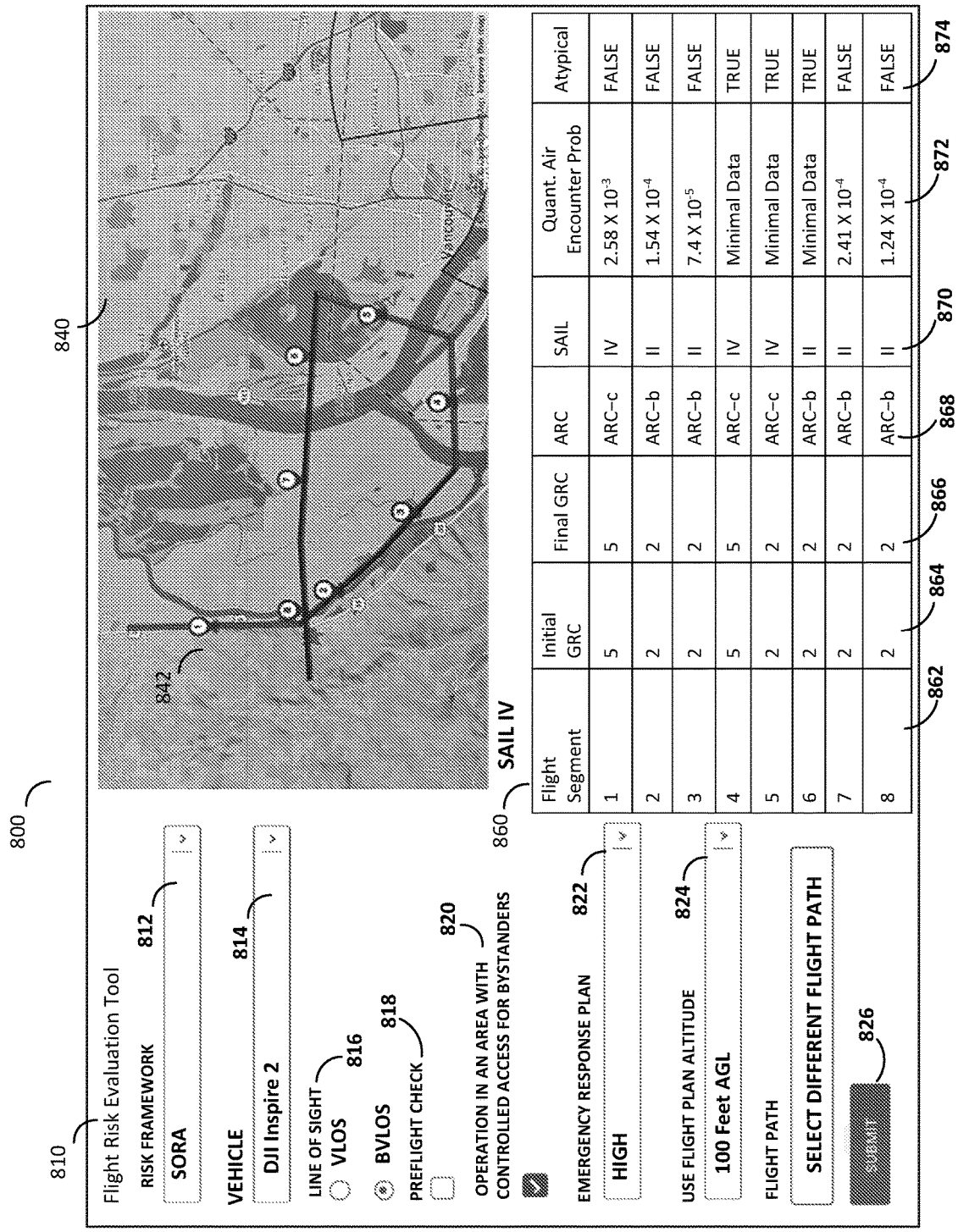

FIG. 8 illustrates an exemplary embodiment of a software-implemented risk evaluation tool, for example a cloud-based solution, an app, a website, or the like. This software-based implementation may provide a service to be used in the processing of mission data to reach a risk assessment decision. In an exemplary embodiment, the software risk assessment makes accessible to a user a risk framework, where the user may be a vehicle operator, a regulatory entity, an airspace operator, and/or any other interested third party. In one embodiment, information is input in whole or in part through a graphical or non-graphical user interface, such as via human and/or computer interaction with an app or website via sliders, discrete numeric or character input, selection of desired characteristics (e.g., drop down menus, checked boxes, radio buttons, or other features that may be interacted with), autofilled fields with stored, calculated, or predicted values, or any other appropriate type of input. In some embodiments, the software may allow for the upload of data (such as a flight plan) and input data may be pulled therefrom. For instance, a pilot, operator, regulatory entity, etc. may access the software via an app stored on an iPad or other mobile device, slightly before the planned time of flight (or otherwise in advance of the flight or prior to takeoff), to reach a risk assessment decision that may guide a decision as to whether to proceed with the flight.

FIG. 8 illustrates an exemplary graphical user interface 800 accessible through, e.g., an app or website. The interface 800 includes three sections, an input section 810 (such section titled "Flight Risk Evaluation Tool"), and two output sections: a map 840 showing labelled flight segments (here, numbered as segments 1-8) and a table 860 indicating a correspondence between each flight segment and a calculated risk. Input section 810 sets out a plurality of input fields. In the example of FIG. 8, the fields require manual entry, however, embodiments may exists where one or more fields are self-populated based on data automatically pulled from the vehicle itself (e.g., from vehicle sensors or hardware registration data) or from third-party systems (e.g., previously-filed registration data corresponding to vehicle type or flight plan, geographic or regulatory data relevant to a flight plan (such as, e.g., a required altitude), or any other appropriate information from the source databases set forth in, e.g., FIG. 2. Field 812 of input section 810 (FIG. 8) allows for the specification of a risk framework. In the embodiment of FIG. 8, a SORA framework is selected, so as to obtain a resultant output SAIL value. In some embodiments, the remainder of the fields in input section 810 may not be selected (or may be altered) after the selection of the risk framework 812, as the necessary input values may change in accordance with a particular framework's requirements. In the example of FIG. 8, where a SORA framework has been selected as input 812, input section 810 also contains a field 814 to input a vehicle type, a field 816 to input whether the vehicle is a VLOS or BVLOS vehicle, a field 818 to indicate whether a preflight check has been performed, a field 820 to indicate whether the area of vehicle operation is an area with controlled access for bystanders (e.g., a restricted or blocked-off area), a field 822 to indicate the strictness (and/or existence) of an emergency response plan, a field 824 to indicate an altitude for the flight plan, and a submit field 826. It will be understood that while the fields are shown as drop-down fields, radio buttons, or checked boxes, any type of manual or automated input may be used. For example, in one embodiment, vehicle type information may be pulled automatically from vehicle hardware or sensors without human input.

The number of data fields, and the range or type of data to be input need not to be limited to that shown in FIG. 8. Initially, the input fields may differ based on the selection of a different source risk framework. Further, the type or form of data input may vary in different embodiments. As just one example, in the illustration of FIG. 8, emergency response plan 822 may be selected from a set of options, such as none, low, medium, high. In other embodiments, any set of appropriate selected values may be used, such as one or more fields for inputting more specific emergency remediation information, for example, whether the vehicle has a parachute, the number of emergency egress points for a passenger from the vehicle and for the vehicle from the flight plan, and/or or physical or procedural safety features which may contribute to an emergency response plan. In some embodiments, quantitative inputs corresponding to the presence or absence of certain safety features may be used. Similarly, each of the other fields of input section 810 may be implemented with different input values/choices, in various embodiments, to facilitate the needs of the logic to be implemented by the risk framework. In some embodiments, the risk assessment may include the processing and transformation of wholly or partly qualitative data to quantitative data, or vice versa.

Once the submit button 826 is pressed, sections 840 and 860 may be populated based on the output of one or more calculations performed based on the input data. Exemplary section 840 illustrates a map based upon a flight path provided by an operator (or otherwise previously-stored, such as a shared, common, or test flight path which may be stored in advance and available for use by the operator). The flight path is shown broken up into several legs or segments of the flight, such breakdown typically being provided as part of the flight plan. Each segment may have different relevant information, such as a different range of altitude, and may pass over differently zoned or populated areas, so as to require the calculation of a different risk value for each respective section.

Risk calculations for each respective segment are shown in section 860 of the user interface 800. With reference to flight segment 8, the risk assessment tool may calculate a set of risk data which would typically be output as a result of the application of the SORA framework (which exemplary framework was selected in field 812). The application of SORA, for instance, results in the calculation of SAIL values to indicate risk. The illustration of FIG. 8 shows that the risk evaluation tool determined, for segment 8, an initial ground risk class (GRC) 864 with a value of 2, a final GRC 866 with a value of 2, an air risk class (ARC) 868 with a value of ARC-b, and a final SAIL score 870 with a value of SAIL II. In addition, the software calculated a quantitative air encounter probability 872 and a determination 874 of whether the airspace is "atypical" (per SORA). The results illustrated are of course exemplary and different results are possible in different embodiments and/or with different input values. It will also be generally understood that these categories 862-874 and the values assigned thereto may change in other embodiments if a different risk framework is applied. The calculation of the GRC and ARC (or in other embodiments, a ground risk value and an air risk value) may, in an exemplary embodiment, be performed in a manner along the lines of that described above with reference to FIGS. 1-7. In some embodiments, in addition to, or in an alternative to, the values illustrated in section 860 of FIG. 8, the software implementation of the risk assessment may provide a recommendation for risk mitigation (such as, for example, to add a parachute), a risk report, a risk analysis score, and/or any other type of data which may be useful to an air traffic management agency or software (such as a numerical air and/or ground risk value).

In some embodiments, the software may provide a flight path approval or denial that may in some instances limit whether the flight may take off. In some embodiments, an operator may immediately perform a pre-flight check, modify their vehicle, flight plan, emergency procedures, or the like, and may use the user interface 800 to input the new flight information (through section 810) and request a new risk assessment output using the new inputs. In other embodiments, a denial of flight may require, for instance, a wait time before resubmission of information for a new risk assessment output, and/or proof of remediation (such as the filing of a new flight plan with a regulatory agency) other additional submitted information, or evidence of changed conditions, whether documentary or sensed from other data sources. In some embodiments, the risk assessment software may access the vehicle's systems or a third-party system to capture data indicating that the operator has mitigated, modified, or improved their vehicle or flight plan before reassessment, though in other embodiments, modification of the inputs by the operator to the software (or submission of supporting materials) may be sufficient.

In general, it may be understood that use of the risk assessment software as shown in exemplary FIG. 8 may reduce or eliminate the need for human review and oversight of each aspect of flight plan, and may thereby a shorten the time for risk assessment and/or pre-flight approval to hours, minutes, or even within real time, rather than days or weeks. In addition, the risk assessment software of FIG. 8 may be customized to address multiple flight risk frameworks which may be applicable in different regions and/or geographic areas, thus allowing the operator to select one or multiple frameworks with which to perform a safety assessment. Still further, in an exemplary embodiment, the software of FIG. 8 implements a consistent, repeatable logic given a set of inputs, and may therefore have its logic validated and/or certified by any appropriate regulatory agency, where appropriate. Accordingly, the use of the exemplary software of FIG. 8 may function to streamline the pre-flight risk assessment process.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single embodiment described herein, but rather should be construed in breadth and scope in accordance with the appended claims.

The invention claimed is:

1. A method of assessing safety risk associated with a flight plan of an aircraft, the method comprising:
receiving, from the operator of the aircraft, a flight plan, the aircraft being scheduled to implement the flight plan, wherein the flight plan comprises a departure location, a destination location, one or more altitudes at which the aircraft is scheduled to fly before arriving at the destination, and one or more intermediate geographic areas over which the aircraft is scheduled to fly before arriving at the destination location;
determining, based on the flight plan including at least the one or more altitudes and the one or more intermediate geographic areas, a plurality of 2-dimensional virtual areas at risk to the aircraft when the aircraft is flying according to the flight plan;
determining, based on the flight plan, a plurality of 3-dimensional voxels corresponding to the intermediate geographic areas;
receiving, from a remote system, satellite data indicating the respective population density of the plurality of 2-dimensional virtual areas;
calculating, based on the satellite data, for each of the plurality of 2-dimensional virtual areas, a respective ground risk value corresponding to the 2-dimensional virtual area;
calculating, based on each of the respective ground risk values for the plurality of 2-dimensional virtual areas, a ground risk value for the flight plan;
receiving from a remote system, air surveillance data corresponding to the plurality of 3-dimensional voxels;
calculating, based on the air surveillance data, for each of the plurality of 3-dimensional voxels, a respective probability of collision for the 3-dimensional voxel;
calculating, based on the respective probabilities of collision for the plurality of 3-dimensional voxels, an air risk value for the flight plan; and
transmitting, to the operator of the aircraft, based on the calculated ground risk value for the flight plan and the calculated air risk value for the flight plan, a risk assessment indicator.

2. The method of claim 1, wherein the received air surveillance data corresponding to a 3-dimensional voxel comprises historic flight path data for aircraft within the voxel within a predetermined period of time prior to a flight by the aircraft for the flight plan,
wherein the calculating of the respective probability of collision for each of the 3-dimensional voxels further comprises aggregating the historic flight path data for aircraft within the voxel to determine an airspace density corresponding to a likelihood of collision within the voxel, and
wherein the calculating of the air risk value for the flight plan further comprises aggregating the determined airspace densities of each of the 3-dimensional voxels.

3. The method of claim 2, further comprising:
modifying the determined airspace density within the voxel based on a temporal condition,
wherein the temporal condition is one of: a weather condition or a time of day.

4. The method of claim 2, wherein the calculating of the respective probability of collision for each of the 3-dimensional voxels further comprises:
dividing the 3-dimensional voxel into a plurality of respective virtual spaces, each respective virtual space corresponding to a different range of altitude; and
determining an airspace density corresponding to a likelihood of collision within each virtual space within the 3-dimensional voxel, and
wherein, in the calculating of the air risk value for the flight plan, the aggregating comprises aggregation of the airspace densities of the virtual spaces, of each voxel, corresponding to a range of altitude into which the one or more altitudes fall.

5. The method of claim 3, wherein the temporal condition is the weather condition.

6. The method of claim 1, further comprising:
comparing at least one of the calculated ground risk value for the flight plan and the calculated air risk value for the flight plan to a predetermined matrix of risk assessment decisions, the matrix containing risk remediation information; and
transmitting, to the operator of the aircraft, corresponding risk remediation information.

7. The method of claim 1, further comprising:
receiving, from a sensor of the aircraft, battery information of the aircraft; and
calculating, based on the battery information, a battery risk value for the flight plan,
wherein the risk assessment indicator is determined based on the calculated ground risk value for the flight plan, the calculated air risk value for the flight plan, and the calculated battery risk value for the flight plan.

8. The method of claim 1, further comprising:
receiving, from a remote system, temporal information relating to the flight plan; and
calculating, based on the temporal information, a temporal risk value for the flight plan,
wherein the risk assessment indicator is determined based on the calculated ground risk value for the flight plan, the calculated air risk value for the flight plan, and the calculated temporal risk value for the flight plan.

9. The method of claim 1, further comprising:
receiving, from the operator of the aircraft, vehicle information associated with the aircraft; and
transforming the received vehicle information into one or more numerical values indicative of one of more of: a maintenance history of the aircraft and a vehicle fault history of the aircraft,
wherein the calculation of the air risk value for the flight plan is further based on the transformed vehicle information.

10. The method of claim 1, wherein the determining the plurality of 2-dimensional virtual spaces is based on a weather condition.

11. The method of claim 1, wherein the determining the plurality of 2-dimensional virtual spaces is based on one or more speeds expected for the aircraft when the aircraft is flying according to the flight plan.

12. The method of claim 1, wherein the calculating the ground risk value for the flight plan comprises aggregating the ground risk values corresponding to the 2-dimensional virtual areas.

13. A system for assessing safety risk associated with a flight plan of an aircraft, the system comprising:
a memory storing instructions; and
a processor configured to, when executing the instructions, perform steps comprising:
(a) displaying, on a display screen, a user interface;
(b) receiving, via the user interface, information comprising the flight plan and a type of the aircraft;
(c) transforming the received information into one or more numerical values indicative of one or more geographic areas over which the aircraft is scheduled to fly, and an altitude at which the aircraft is scheduled to fly;
(d) determining, based on the flight plan, a plurality of 3-dimensional voxels corresponding to the one or more geographic areas;
(e) receiving, from a remote system, air surveillance data corresponding to the plurality of 3-dimensional voxels;
(f) calculating, based on the air surveillance data and the type of aircraft indicated by the information, for each of the plurality of 3-dimensional voxels, a respective probability of collision for the 3-dimensional voxel;
(g) calculating, based on the respective probabilities of collision for each of the plurality of 3-dimensional voxels, an air risk value for the flight plan; and
(h) displaying, via the user interface, a risk assessment indicator based on the calculated air risk value for the flight plan.

14. The system of claim 13, wherein the processor is further configured to, when executing the instructions, perform steps comprising:
determining, based on the flight plan, a plurality of 2-dimensional virtual areas corresponding to the geographic areas;
receiving, from a remote system, satellite data indicating the respective population density of the plurality of 2-dimensional virtual areas;
calculating, based on the satellite data, for each of the plurality of 2-dimensional virtual areas, a respective ground risk value for the 2-dimensional virtual area;
calculating, based on the respective ground risk values for each of the plurality of 2-dimensional virtual areas, a ground risk value for the flight plan; and
displaying, via the user interface, a risk assessment indicator based on the calculated ground risk value for the flight plan.

15. The system of claim 14, wherein the processor is further configured to, when executing the instructions, perform steps comprising:
comparing at least one of the calculated ground risk value for the flight plan and the calculated air risk value for the flight plan to a predetermined matrix of risk assessment decisions, the matrix containing risk remediation information; and
transmitting, to the operator of the aircraft, risk remediation information based on the comparing.

16. The system of claim 13, wherein the risk assessment indicator is a recommendation for a mitigating action to reduce risk associated with the flight plan.

17. The system of claim 13, wherein the processor is further configured to, when executing the instructions, perform steps comprising:
receiving, via the user interface, modification information regarding a modification to one of: the aircraft or the flight plan; and
displaying, via the user interface, an updated risk assessment indicator based on the received modification information.

18. The system of claim 13, wherein the received air surveillance data corresponding to a 3-dimensional voxel comprises historic flight path data for aircraft within the voxel within a predetermined period of time,
wherein the calculating of the respective probability of collision for each of the plurality of 3-dimensional voxels comprises aggregating historic flight path data for aircraft within the voxel to determine an airspace density corresponding to a likelihood of collision within the voxel, and
wherein the calculating of the air risk value for the flight plan comprises aggregating the determined airspace densities of each of the plurality of 3-dimensional voxels.

19. The system of claim 13, wherein the processor is further configured to, when executing the instructions, perform steps comprising:
sub-dividing each of the plurality of 3-dimensional voxels into a plurality of respective altitude ranges;
determining an airspace density corresponding to a likelihood of collision within each altitude range of a 3-dimensional voxel; and
aggregating the airspace densities of the altitude ranges, of each voxel, that correspond to the altitude of the flight plan.

20. The system of claim 13, wherein the processor is further configured to, when executing the instructions, perform steps comprising:
receiving, from a sensor of the aircraft, battery information of the aircraft; and
calculating, based on the battery information, a battery risk value for the flight plan,
wherein the risk assessment indicator is determined based on the calculated ground risk value for the flight plan, the calculated air risk value for the flight plan, and the calculated battery risk value for the flight plan.

21. The system of claim 13, wherein the processor is further configured to, when executing the instructions, perform steps comprising:
- receiving, from a remote system, temporal information relating to the flight plan; and
- calculating, based on the temporal information, a temporal risk value for the flight plan,
- wherein the risk assessment indicator is determined based on the calculated air risk value for the flight plan and the calculated temporal risk value for the flight plan.

22. The system of claim 13, wherein the processor is further configured to, when executing the instructions, perform steps comprising:
- receiving, from the operator of the aircraft, vehicle information associated with the aircraft; and
- transforming the received vehicle information into one or more numerical values indicative of one of more of: a maintenance history of the aircraft and a vehicle fault history of the aircraft,
- wherein the calculation of the air risk value for the flight plan is further based on the transformed vehicle information.

23. The system of claim 13, wherein the processor is configured to, when executing the instructions, determine at least one speed associated with the type of the aircraft indicated by the information, and wherein the calculating the respective probability of collision is based on the determined at least one speed.

24. The system of claim 13, wherein the calculating the respective probability of collision is based on one or more weather conditions.

25. A non-transitory computer readable storage medium storing instruction that, when executed, cause a computer system to perform steps comprising:
- displaying, on a display screen, a user interface;
- receiving, via the user interface, information comprising a flight plan of an aircraft and vehicle information of the aircraft, wherein the flight plan comprises one or more altitudes at which the aircraft is scheduled to fly and one or more geographic areas over which the aircraft is scheduled to fly;
- determining, based on the flight plan including at least the one or more altitudes and the one or more intermediate geographic areas, a plurality of 2-dimensional virtual areas at risk to the aircraft when the aircraft is flying according to the flight plan;
- receiving, from a remote system, satellite data indicating the respective population density of the plurality of 2-dimensional virtual areas;
- calculating, based on the satellite data, for each of the 2-dimensional virtual areas, a respective ground risk value for the 2-dimensional virtual area;
- calculating, based on the respective ground risk values for each of the 2-dimensional virtual areas, a ground risk value for the flight plan;
- determining, based on the flight plan, a plurality of 3-dimensional virtual areas corresponding to the one or more geographic areas;
- receiving, from a remote system, air surveillance data corresponding to the plurality of 3-dimensional virtual areas;
- calculating, based on the air surveillance data, for each of the 3-dimensional virtual areas, a respective probability of collision for the 3-dimensional virtual area;
- calculating, based on the respective probabilities of collision for each of the 3-dimensional virtual areas, an air risk value for the flight plan; and
- displaying, via the user interface, risk assessment information based on at least one of: the calculated air risk value for the flight plan and the calculated ground risk value for the flight plan.

* * * * *